(12) United States Patent
Bae et al.

(10) Patent No.: US 11,873,827 B2
(45) Date of Patent: Jan. 16, 2024

(54) CEILING FAN AND METHOD FOR CONTROLLING THE SAME

(71) Applicant: LG ELECTRONICS INC., Seoul (KR)

(72) Inventors: Jihoon Bae, Seoul (KR); Atul Dhiman, Seoul (KR); Shivendra Singh, Seoul (KR); Anand Anand, Seoul (KR); Seulki Kim, Seoul (KR); Yeongcheol Mun, Seoul (KR); Jeeman Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 485 days.

(21) Appl. No.: 16/977,386

(22) PCT Filed: Apr. 2, 2019

(86) PCT No.: PCT/KR2019/003881
§ 371 (c)(1),
(2) Date: Sep. 1, 2020

(87) PCT Pub. No.: WO2019/240359
PCT Pub. Date: Dec. 19, 2019

(65) Prior Publication Data
US 2021/0048032 A1 Feb. 18, 2021

(30) Foreign Application Priority Data

Jun. 12, 2018 (KR) .................. 10-2018-0067476
Jun. 12, 2018 (KR) .................. 10-2018-0067478

(Continued)

(51) Int. Cl.
*F04D 25/08* (2006.01)
*F04D 27/00* (2006.01)
(Continued)

(52) U.S. Cl.
CPC .......... *F04D 27/00* (2013.01); *F04D 25/088* (2013.01); *F04D 29/38* (2013.01); *F04D 29/522* (2013.01);
(Continued)

(58) Field of Classification Search
CPC ...................................................... F04D 29/38
See application file for complete search history.

(56) References Cited

U.S. PATENT DOCUMENTS 2,790,596 A 4/1957 Stirling
4,892,460 A * 1/1990 Volk ...................... F04D 25/088
416/62

(Continued)

FOREIGN PATENT DOCUMENTS

CN 2400737 Y * 10/2000
EP 2333346 A2 6/2011
(Continued)

*Primary Examiner* — Courtney D Heinle
*Assistant Examiner* — Danielle M. Christensen
(74) *Attorney, Agent, or Firm* — Bryan Cave Leighton Paisner LLP

(57) ABSTRACT

According to an embodiment of the present disclosure, a ceiling fan includes a shaft coupled to a ceiling or a wall surface, a housing cover provided at a central axis thereof with a shaft and receiving a motor assembly and an electronic unit, and a blade coupled to the housing cover. The electronic unit is provided in a multi-stage.

13 Claims, 20 Drawing Sheets

(30) Foreign Application Priority Data

| | | |
|---|---|---|
| Jun. 12, 2018 | (KR) | 10-2018-0067501 |
| Jun. 12, 2018 | (KR) | 10-2018-0067507 |
| Mar. 15, 2019 | (KR) | 10-2019-0030039 |

(51) Int. Cl.

| | |
|---|---|
| F04D 29/52 | (2006.01) |
| F04D 29/38 | (2006.01) |
| F04D 29/64 | (2006.01) |
| F24F 11/79 | (2018.01) |
| F24F 110/10 | (2018.01) |
| F24F 110/20 | (2018.01) |
| F24F 110/50 | (2018.01) |

(52) U.S. Cl.
CPC ............ *F04D 29/646* (2013.01); *F24F 11/79* (2018.01); *F24F 2110/10* (2018.01); *F24F 2110/20* (2018.01); *F24F 2110/50* (2018.01); *Y02B 30/70* (2013.01)

(56) References Cited

U.S. PATENT DOCUMENTS

| | | | | |
|---|---|---|---|---|
| 8,672,649 | B2* | 3/2014 | Smith | F04D 29/5806 417/42 |
| 9,593,687 | B2* | 3/2017 | Iwamoto | F04D 29/329 |
| 10,379,208 | B2* | 8/2019 | Steiner | F24F 7/007 |
| 10,612,553 | B2* | 4/2020 | McPherson | F04D 25/068 |
| 10,927,841 | B2* | 2/2021 | Banks | F04D 27/004 |
| 2004/0101423 | A1 | 5/2004 | Bird et al. | |
| 2005/0277381 | A1 | 12/2005 | Banerjee et al. | |
| 2007/0139884 | A1 | 6/2007 | Foster, Sr. et al. | |
| 2014/0023507 | A1 | 1/2014 | Smith et al. | |
| 2015/0308438 | A1 | 10/2015 | Janecek | |
| 2016/0047391 | A1* | 2/2016 | McPherson | F04D 25/0693 318/504 |
| 2017/0218962 | A1 | 8/2017 | Yamamoto et al. | |
| 2018/0119973 | A1* | 5/2018 | Rothman | F24F 11/62 |
| 2019/0264700 | A1* | 8/2019 | Huggins | F04D 27/002 |
| 2020/0408425 | A1* | 12/2020 | Zchori | F24F 3/1423 |

FOREIGN PATENT DOCUMENTS

| | | | |
|---|---|---|---|
| JP | 2009250190 A | 10/2009 | |
| JP | 2015055157 A | 3/2015 | |
| KR | 1020090061172 A | 6/2009 | |
| WO | WO-2011016703 A2 * | 2/2011 | ............ A01M 29/18 |

\* cited by examiner

R : FORWARD DIRECTION   C : AIR CIRCULATION IN COOLING MODE
R' : REVERSE DIRECTION   H : AIR CIRCULATION IN HEATING MODE

CEILING FAN AND METHOD FOR CONTROLLING THE SAME

This application is the National Phase of PCT International Application No. PCT/KR2019/003881, filed on Apr. 2, 2019, which claims the benefit of Korean Patent Application No. 10-2018-0067476 filed on Jun. 12, 2018, Korean Patent Application No. 10-2018-0067478 filed on Jun. 12, 2018, Korean Patent Application No. 10-2018-0067501 filed on Jun. 12, 2018, Korean Patent Application No. 10-2018-0067507 filed on Jun. 12, 2018, and Korean Patent Application No. 10-2019-0030039 filed on Mar. 15, 2019, the contents of which are all hereby incorporated by reference herein in their entirety.

TECHNICAL FIELD

The present disclosure relates to a ceiling fan and a method for controlling the same.

BACKGROUND ART

A flow generating device refers to a device which drives a fan to generate air flow and to provide the generated air flow to a user. Such a flow generating device is usually called a fan.

The flow generating device may be variously classified according to a flow generation manner, a function, an installation manner, and the like. A device, which is installed on a wall surface or a ceiling, of the flow generating device to generate an air flow is called a ceiling fan.

The ceiling fan has been widely used in homes or malls because the ceiling fan may provide economic advantages to the user as the ceiling fan requires power less than an air conditioner or a general fan.

Generally, the ceiling fan includes a drive motor to provide power and a plurality of blades connected to a shaft of the drive motor.

The ceiling fan may circulate air in a room by using wind generated by the rotation of the blades. Accordingly, the ceiling fan may lower or raise the indoor temperature.

The ceiling fan differs from a conventional flow generating device which is disposed on the ground surface to be erected to concentrate the air flow in a local space. In detail, the ceiling fan may be positioned on the ceiling higher than the user to force the air flow in a larger volume.

Therefore, the ceiling fan may circulate the air in the entire room to uniformly make the temperature distribution in the room, thereby providing the sense of comfort to the user.

However, a conventional ceiling fan has the following problems.

First, a conventional problem has a problem that a blade unit, which is rotating, is integrally coupled with components. In other words, when a user views the ceiling fan, the lower components of the ceiling fan rotate together with the blade unit. Accordingly, the conventional ceiling fan may not provide visual information through lower components.

Second, since the conventional ceiling fan has a larger number of components rotating with the blade, greater rotation power may be provided from a motor to increase vibration and noise.

Third, in the conventional ceiling fan, a driver chip to control the motor is installed in the motor assembly. In other words, to install the driver chip to control the motor, the installation space of an additional PCB has to be ensured inside the motor assembly. Accordingly, to prevent various wires which link the PCB with the motor from interfering with the motor rotating, the structure is complicated.

Fourth, when a plurality of electronic components are installed inside a plurality of electronic components inside the conventional ceiling fan, it is difficult to satisfy the standards of an Electro Magnetic Interference (EMI) or an electrostatic discharge (ESD).

Fifth, the conventional ceiling fan has no unit to prevent the access of the pests.

Sixth, the conventional fan may not interwork with other air conditioning products variously installed in the room.

The information on a prior art related to this document is as follows.

(Patent Document 1) Publication No. (Published Date): US Patent Application Publication No. US 2017/0218962 A1 (published on Aug. 3, 2017)

DISCLOSURE

Technical Problem

The present disclosure is to provide a ceiling fan capable of improving air circulation in a room.

The present disclosure is to provide a ceiling fan capable of resolving air stagnation caused in a partial space of a room.

The present disclosure is to provide a ceiling fan capable of firmly fixing and supporting internal components in a ceiling fan equipped with a motor having an outer rotor.

The present disclosure is to provide a ceiling fan capable of resolving space and position limitations in installing a plurality of electronic components.

The present disclosure is to provide a ceiling fan capable of resolving problems related to the load caused by a plurality of electronic components.

The present disclosure is to provide a ceiling fan capable of minimizing vibration and noise caused due to the friction between parts, which is made by rotation.

The present disclosure is to provide a ceiling fan capable of stably maintaining the coupling of the electronic unit by minimizing the influence of the rotation of the blade.

The present disclosure is to provide a ceiling fan capable of easily satisfying the international standards of the ESD and the EMI.

The present disclosure is to provide a ceiling fan capable of improving visibility and readability in order to provide information to a user viewing the ceiling of a room.

The present disclosure is to provide a ceiling fan capable of improving heat radiation capability while providing a plurality of electronic components in a compact size.

The present disclosure is to provide a ceiling fan having various user convenience functions.

The present disclosure is to provide a ceiling fan capable of eliminating pests.

The present disclosure is to provide a ceiling fan, capable of operating while interworking with air conditioning products installed in a room, and a method for controlling the same.

The present disclosure is to provide a ceiling fan capable of integrally performing air conditioning in a room and a method for controlling the same.

The present disclosure is to provide a ceiling fan capable of cooling or heating efficiency and a method for controlling the same.

The present disclosure is to provide a ceiling capable of improving the operating efficiency by interworking with cooling and heat appliances and a method for controlling the same.

Technical Solution

In order to accomplish the above objects, according to an embodiment of the present disclosure, a ceiling fan includes a shaft coupled to a ceiling or a wall surface, a housing cover provided at a central axis thereof with the shaft and receiving a motor assembly and an electronic unit, and a blade coupled to the housing cover. In addition, the electronic unit may be provided in a multi-floor or a multi-stage.

In addition, the electronic unit may have a vertical stack structure. In detail, the electronic unit may be positioned under the motor assembly. In more detail, the electronic unit may include a higher-floor electronic unit positioned under the motor assembly and a lower-floor electronic unit positioned under the higher-floor electronic unit.

In addition, the ceiling fan may further include a bridge support coupled to the shaft to fix the higher-floor electronic unit and the lower-floor electronic unit.

In addition, the motor assembly may include a stator coupled to the shaft, and a rotor spaced apart from an outer circumferential surface of the stator and rotating, and In this case, the housing cover is coupled to the rotor.

In addition, the rotor may include a cover coupling part to guide the housing cover such that the housing cover is coupled to an upper portion of the cover coupling part.

In addition, the housing cover may be inserted into the blade to form a gap inside the blade.

In addition, the housing may further include an upper cover and a lower cover to protect the shaft from the outside. In addition, the housing cover may be inserted and positioned to form a space from a lower end of the lower cover.

In addition, the bridge support may be coupled to a lower portion of the shaft.

In addition, the electronic unit may include a bridge case coupled to the bridge support, a control assembly seated on the bridge case, and a display cover coupled to a low portion of the bridge case.

Alternatively, the display cover may be positioned to form a space from a lower end of the housing cover.

In addition, the bridge case is coupled to the display cover to cover an internal space having a plurality of electronic components therein.

In addition, the control assembly may include a lower control case seated on a top surface of the bridge case and an upper control case to cover an upper portion of the lower control case.

In accordance with another aspect, according to an embodiment of the present disclosure, a ceiling fan may include a fixing unit which is a static component and a rotating unit which is a dynamic component.

The rotating unit may include a housing cover coupled to a rotor, a main blade coupled to the housing cover, and a sub-blade coupled to the main blade and positioned in a space formed inside the main blade.

The fixing unit may include a shaft coupled to a ceiling or a wall surface. In addition, the fixing unit may further include an electronic unit coupled to the shaft and installed in a non-rotation position.

In addition, the fixing unit may further include a bridge support coupled to a lower portion of the shaft to define the installation space for the electronic unit in the lower portion.

In addition, the bridge support may include a support plate coupled to the shaft, and a plurality of bridges extending downward from the support plate.

In addition, the support plate may include a shaft insertion part provided at the central portion to guide the insertion of the shaft.

In addition, the electronic unit may include a bridge case coupled to the bridge support, a control assembly positioned between the bridge case and the bridge support, and a display cover coupled to a lower portion of the bridge case.

In addition, the bridge case may include a seating rib protruding from a top surface thereof to seat the control assembly.

According to another aspect, according to an embodiment of the present disclosure, a ceiling fan may include a shaft coupled to a ceiling or a wall surface, a motor assembly coupled to the shaft to provide rotation power, a bridge support coupled to the shaft and positioned under the motor assembly, a bridge case coupled to a lower portion of the bridge supporter, a control assembly interposed between the bridge case and the bridge supporter, a display cover coupled to the lower portion of the bridge case, and a display module installed on the display cover and including a light emitting device.

In addition, the display cover may include a light guide having a top surface and a lower surface to guide light provided from the light emitting device.

In addition, the light guide may be formed to extend upward from the base surface of the display cover.

In addition, a plurality of light guides may be provided and having mutually different sizes.

In addition, the light guide may be formed such that the sectional area of the light guide is reduced upward.

In addition, the display module may be seated on the upper end of the light guide.

Further, the light emitting device may include a light emitting diode (LED).

In addition, the display cover may include an escutcheon mounted thereon to transmit a light.

In other words, the escutcheon may have a pattern indicating the function of the ceiling fan, which is formed at a position corresponding to the light emitting device and the light guide in the vertical direction.

In addition, the pattern indicating the function of the ceiling fan may indicate any one of the rotation direction of a blade, the power state, the communication connection state, an operating state for power saving, the operating state of the anti-bug module, and a timer operating state.

In addition, the display cover may include a plurality of display module guides protruding upward from the base surface. In addition, the display module may be fixed by a plurality of display module guides.

Further, the display cover may further include a display module coupling device elastically deformed. In addition, the display module may be introduced into the display module coupling device and mounted.

Further, the display cover may further include a communication module guide to fix one side of the communication module to make communication with an external device and a communication module locking part to fix an opposite side of the communication module.

In addition, the communication module guide may have an upper end bent such that the communication module is seated.

In addition, the communication module locking part may extend in the circumferential direction such that the communication module is seated.

In addition, the control assembly may include a lower control case seated on the bridge case, an upper control case to cover the lower control case, and a main PCB disposed in an internal space formed by the lower control case and the upper control case.

The main PCB may be provided thereon with a driver chip to control a rotating number of a motor provided in the motor assembly and a capacitor to obtain a capacitance.

In addition, the lower control case may include a heat radiation groove which is recessed downward to radiate heat from the capacitor.

Further, the bridge case may include an inner bridge extending upward from a top surface thereof.

In addition, an inner bridge may pass through or may be inserted into the lower control case, the main PCB, and the upper control case.

In addition, the inner bridge may include a first inner bridge and a second inner bridge extending upward and having different heights.

In addition, the ceiling fan may include the motor assembly, the bridge supporter, a housing cover received inside the control assembly and the bridge case, and a plurality of blades coupled to the housing cover.

In addition, the plurality of blades may include a main blade and a sub-blade positioned in a space formed inside the main blade.

According to still another aspect, according to an embodiment of the present disclosure, a ceiling fan may include a shaft coupled to a ceiling, a motor assembly to provide power, and a plurality of blades linked to the motor assembly to rotate.

In addition, the ceiling fan may include a control assembly including a control unit to control the motor assembly, a bridge case positioned under the control assembly, a bridge supporter to support the bridge case above the control assembly, a display cover coupled to a lower portion of the bridge case to form an internal space, and an anti-bug module installed in the internal space to eliminate pests.

Further, the anti-bug module may include an anti-bug PCB including an ultrasonic oscillation circuit, and a speaker connected with the anti-bug PCB to output an ultrasound.

In addition, the anti-bug PCB may vary the frequency range to generate the ultrasound.

Further, the anti-bug PCB may be installed in the bridge case.

In addition, the bridge case may include a fixing guide protruding from the inner surface to guide the coupling of the anti-bug PCB.

In addition, the fixing guide may be bent to fix the corners of the anti-bug PCB.

In addition the anti-bug PCB may include a snap to fix the anti-bug PCB.

Further, the anti-bug PCB may be mounted in the snap in a press-fitting manner.

In addition, the speaker may be installed on the display cover.

The display cover may include an output hole to provide the ultrasound, which is output from the speaker, to an interior space.

Further, the output hole may be positioned in the center of the display cover.

In addition, the speaker may include a hole corresponding to the output hole.

In addition, the display cover may include a speaker coupling part to guide the coupling of the speaker.

In addition, the output hole may be positioned inside the speaker coupling part.

In addition, the speaker coupling part may have a fitting groove into which the speaker is inserted.

In addition, the bridge support may include a plurality of bridge extending downward from the bottom surface thereof.

Further, the bridge case may be formed in the top surface thereof with a plurality of bridge holes into which the plurality of bridges are inserted.

In addition, the bridge case may include inner bridges positioned inward of the plurality of bridge holes.

Further, the inner bridge may extend upward to couple the control assembly.

Further, the bridge case may include a guide sign to guide a user for the installation direction.

In addition, the anti-but module may include a heat sink performing cooling.

According to another aspect, according to an embodiment of the present disclosure, a ceiling fan may include a shaft coupled to the ceiling or the wall surface, a motor assembly connected with the shaft to provide rotation power, a plurality of blades coupled to the motor assembly to rotate, and an electronic unit coupled to the shaft and positioned in the internal space of the motor assembly.

In addition, the electronic unit may include a communication module interworking with an air conditioning product installed in a room, the interworking air conditioning product, and a control unit to control the motor assembly.

In addition, the ceiling fan may further include a memory unit to store data.

Further, the ceiling fan may further include a sensing module to sense a temperature, humidity, a dust quantity.

In addition, the control unit may perform a control operation to manage air in a room by combining information sensed by the sensing module and information received from the interworking air conditioning product.

In addition, the control unit may determine a red zone by comparing a user setting temperature with an indoor temperature with respect to each partitioned space of the interior space.

Further, the control unit may perform a control operation to remove the red zone by changing a setting of a product, which is closer to the red zone, of the interworking air conditioning products.

Further, when some of the interworking air conditioning products is powered off, the control unit may perform a control operation to operate with remaining products which are powered on.

The plurality of blades may include a main blade and a sub-blade positioned in a space formed inside the main blade.

In addition, the electronic unit may further include a display cover in which the communication module is installed and a display module installed on the display cover and including a lighting device.

In addition, the control unit may recognize and control the mutual operating states of the interworking air conditioning products in real time.

According to still another aspect, according to an embodiment of the present disclosure, a method for controlling a ceiling fan including a motor assembly coupled to a shaft coupled to the ceiling and a plurality of blades coupled to the motor assembly to rotate may include performing communication connection with a plurality of air conditioning products installed in an interior space, determining whether to enter a smart circulation mode together with the air conditioning products interworking through the communication connection, and operating in the smart circulation mode to recognize and control mutual operating states in real time together with the interworking air conditioning products.

In addition, in the smart circulation mode, the cooling or heating operation of the interworking air conditioning product may be followed.

Further, the method may include, in the smart circulation mode, determining whether to perform cooling or heating; and determining a rotation direction of the ceiling fan depending on the cooling or the heating.

In addition, the determining of whether to perform cooking or heating is performed based on an operating mode of the interworking air conditioning product Further, the determining of the rotation direction of the ceiling fan depending on the cooling or the heating includes performing forward rotation that the blade rotates in the clockwise direction when the cooling operation is determined, and performing reverse rotation that the blade rotates in a counterclockwise direction when the heating operation is determined.

In addition, the method may further include determining the difference between the user setting information and the sensed information and performing a control operation to change the RPM of the motor provided in the motor assembly.

Further, the method may further include storing the differential value between the indoor temperature and the user setting temperature with respect to each section of the interior space and performing a supplementing operation together with the interworking air conditioning product, based on the stored differential value.

In addition, the performing of the communication connection may include synchronizing a plurality of air conditioning products in a control sequence.

The plurality of air conditioning products may include a heater, a fan, an air conditioner, an air purifier, a dehumidifier, and a humidifier.

The determining of whether to enter the smart circulation mode may be determined based on an on or off state of the interworking air conditioning product.

Advantageous Effects

According to an embodiment of the present disclosure, when compared to the conventional technology, an air volume and a flow rate may be more improved. Accordingly, the sense of comfort of the user may be improved.

In addition, since the reaching range of the air flow is increased, it is possible to minimize or prevent the stagnation of the air flow in a partial space of the room. In other words, the circulation effect of the air in the room may be relatively improved.

Further, it is possible to stably fix and maintain a plurality of electronic components (modules) for providing convenience to the user in the lower structure of the ceiling fan In addition, since the load limit value for supporting a plurality of components is relatively increased, it is advantageous that more various components may be provided under the motor.

Further, an expanded space may be provided, so the plurality of electronic components may be stably fixed.

In addition, since the components of the rotation unit are minimized, even if a relatively less power is supplied, performance at the same level or more improved than the conventional technology may be provided.

Further, the rotation unit and the fixing unit are structurally spaced apart from each other, so the safety and rotation stability of the product can be improved.

Further, the coupling of the electronic component is stably maintained despite the rotation operation of the blade.

Further, the outer appearance is made elegant and the aesthetic sense of the ceiling fan is improved by the cover formed to make a sense of unity with respect to the fixing unit and the rotation unit.

Further, the display provided to provide the operating state of the ceiling fan to the user may maintain the fixed position regardless of the rotation of the blade, thereby improving the visibility of the user.

In addition, since friction-preventing gaps may be formed between the components of the rotating parts that are mutually coupled, friction between parts due to rotation is minimized, thereby minimizing noise and vibration. That is, it is possible to improve the quietness and stability of the product.

In addition, since the module capable of providing various convenience functions may be structurally and stably coupled, the vibration during rotation may be minimized.

In addition, since the control unit (driver IC, Driver IC) to control the motor is provided together with the electronic unit in which a plurality of electric components are installed, instead of the motor assembly, the influence of the motor assembly generating the rotation power by the electromagnetic action is avoided. That is, since unnecessary electromagnetic interference may be avoided, the motor may be more stably controlled.

In addition, it is not necessary to ensure an installation space for a control unit in the motor assembly including a rotor and a stator, thereby relatively simplifying the structure of the motor assembly. Accordingly, the stable rotation may be performed.

In addition, the electronic components to control a plurality of components are concentrated in the electronic unit, thereby structurally easily satisfying the international standards of the ESD and the EMI.

In addition, various lights provided from the display module are guided without the interference therebetween, so the visibility of visual information is improved. Accordingly, the visual information may be easily and exactly transmitted to the user.

In addition, various light emitting scenarios capable of visually informing a user of the functions of products may be implemented.

In addition, the user may intuitively recognize the operating state of the ceiling fan even in a remote place through visual information provided from the ceiling fan.

In addition, since the pests are eliminated by the anti-bug module, the product may be prevented from being contaminated by various pests. As a result, the sanitary and the management of the product may be improved.

In addition, the heat emitted from the plurality of electronic components may be easily circulated.

In addition, another air conditioner installed in the interior space and the ceiling fan interwork with each other, so the internal air conditioning may be integrally managed. Therefore, since the air circulation in the room is effectively performed, the cooling or the heating in the room may be improved.

In addition, since the ceiling fan and another air conditioner interwork with each other to follow the indoor temperature in common, the interior environment may be sensed and fed back in the installation position of each product.

In addition, since the plurality of air conditioning products, which interwork with each other, operate in the positions thereof to satisfy an air conditioning value, such as the setting temperature, required by the user, the plurality of air conditioning products may resolve the red zone of the interior space, and the entire temperature distribution and the air quality in the interior space may be uniformly made as compared to the case that an individual air conditioning product operates.

The cooling or heating in the interior space may be more rapidly performed.

In addition, since the ceiling fan interworks with a plurality of air conditioning products in the room interwork with each other, it is not necessary for the user to individually operate each product. In other words, the user convenience may be improved.

BEST MODE

Mode for Invention

Figure 1:
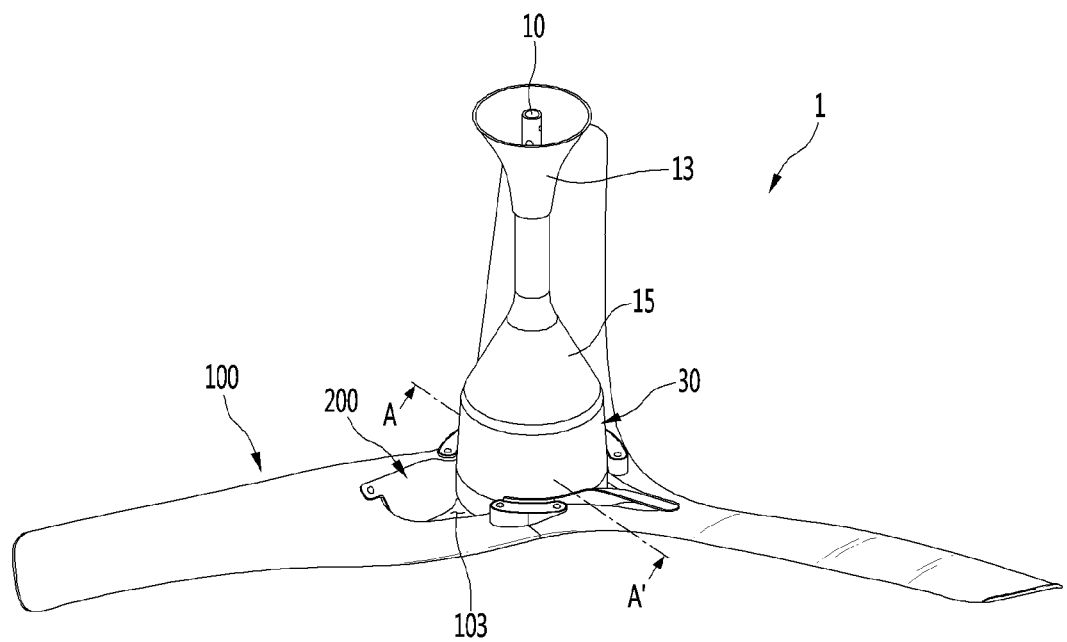
FIG. 1 is a perspective view illustrating a ceiling fan according to an embodiment of the present disclosure.

Hereinafter, some embodiments of the present disclosure will be described in detail with reference to accompanying drawings. In the following description, the same reference numerals will be assigned to the same components even though the components are illustrated in different drawings. In addition, in the following description of an embodiment of the present disclosure, a detailed description of well-known features or functions will be ruled out in order not to unnecessarily obscure the gist of the present disclosure.

In the following description of elements according to an embodiment of the present disclosure, the terms 'first', 'second', 'A', 'B', '(a)', and '(b)' may be used. The terms are used only to distinguish relevant components from other components, and the nature, the order, or the sequence of the relevant components is not limited to the terms. When a certain component is "liked to", "coupled to", or "connected with" another component, the certain component may be directly linked to or connected with the another component, and a third component may be "linked", "coupled", or "connected" between the certain component and the another component.

FIG. 1 is a perspective view illustrating a ceiling fan according to an embodiment of the present disclosure.

Referring to FIG. 1, according to an embodiment of the present disclosure, a ceiling fan 1 may include covers 13, 15, 30, and 90, and a plurality of blades 100 and 200 which are rotatable to allow air to forcibly flow.

The plurality of blades 100 and 200 may include a main blade 100 and a sub-blade 200 positioned in a space formed inside the main blade 100.

The main blade 100 may be formed to extend in a radial direction about the axis of rotation.

In this case, the axis of rotation is the same as the central axis of the covers 13, 15, 30, and 90. In addition, the shafts 10 and 20 are provided to extend along the central axis of the covers 13, 15, 30, and 90. Accordingly, the axis of rotation may be understood as being the central axis of the ceiling fan 1. Hereinafter, the axis of rotation may be referred to as "central axis".

In addition, an inner surface of the main blade 100 may be defined as a lateral side facing the central axis. Accordingly, an outer surface of the main blade 100 may be defined as a lateral side which is opposite to the inner surface and faces the radial direction.

In other words, the main blade 100 may extend by a predetermined length in the radial direction perpendicular to the central axis.

The top surface of the main blade 100 forms a negative pressure surface and the bottom surface of the main blade 100 forms a positive pressure surface.

Meanwhile, the front and rear portions may be defined based on forward rotation that the blades 100 and 200 of the ceiling fan 1 rotate clockwise. For example, the main blade 100 has a leading edge formed on a front surface facing the front portion and a trailing edge formed on a rear surface facing the rear portion, when viewed based on the rotation direction.

A plurality of main blades 100 may be provided. For example, according to an embodiment of the present disclosure, three main blades 100 may be provided. In this case, the number of the main blades 100 is not limited thereto.

Inner ends of the main blades 100 may be connected with each other to be in contact with each other. In addition, a space may be formed in the central portion of the plurality of main blades 100. The covers 13, 15, 30, and 90 and the sub-blade 200 may be positioned in the space.

In detail, the main blade 100 may have a blade hole 103 in which the sub-blade 200 is positioned. For example, the blade hole 103 may be formed by cutting away the inner surface of the main blade 100 such that the inner surface is rounded in the radial direction.

In summary, a blade hole 103 in a semicircular shape is formed inside the main blade 100 and the sub-blade 200 may be positioned in the blade hole 103.

A plurality of sub-blades 200 may be provided corresponding to the number of the main blades 100. For example, according to an embodiment of the present disclosure, three sub-blades 200 may be provided.

The sub-blade 200 may rotate together with the main blade 100. For example, when the main blade 100 rotates clockwise to perform the forward rotation, the sub-blade 200 rotates clockwise together with the main blade 100.

Accordingly, the air in the central portion of the ceiling fan may forcibly flow through the blade hole 103 by the rotation of the sub-blade 200.

The ceiling fan 1 may cause the flow of the air by rotating the dual blades 100 and 200. Accordingly, the air volume and the flow rate provided by the ceiling fan 1 are more increased. In addition, a zone subject to difficult air circulation as an air flow rate is significantly slow in an interior space may be minimized.

Figure 2:
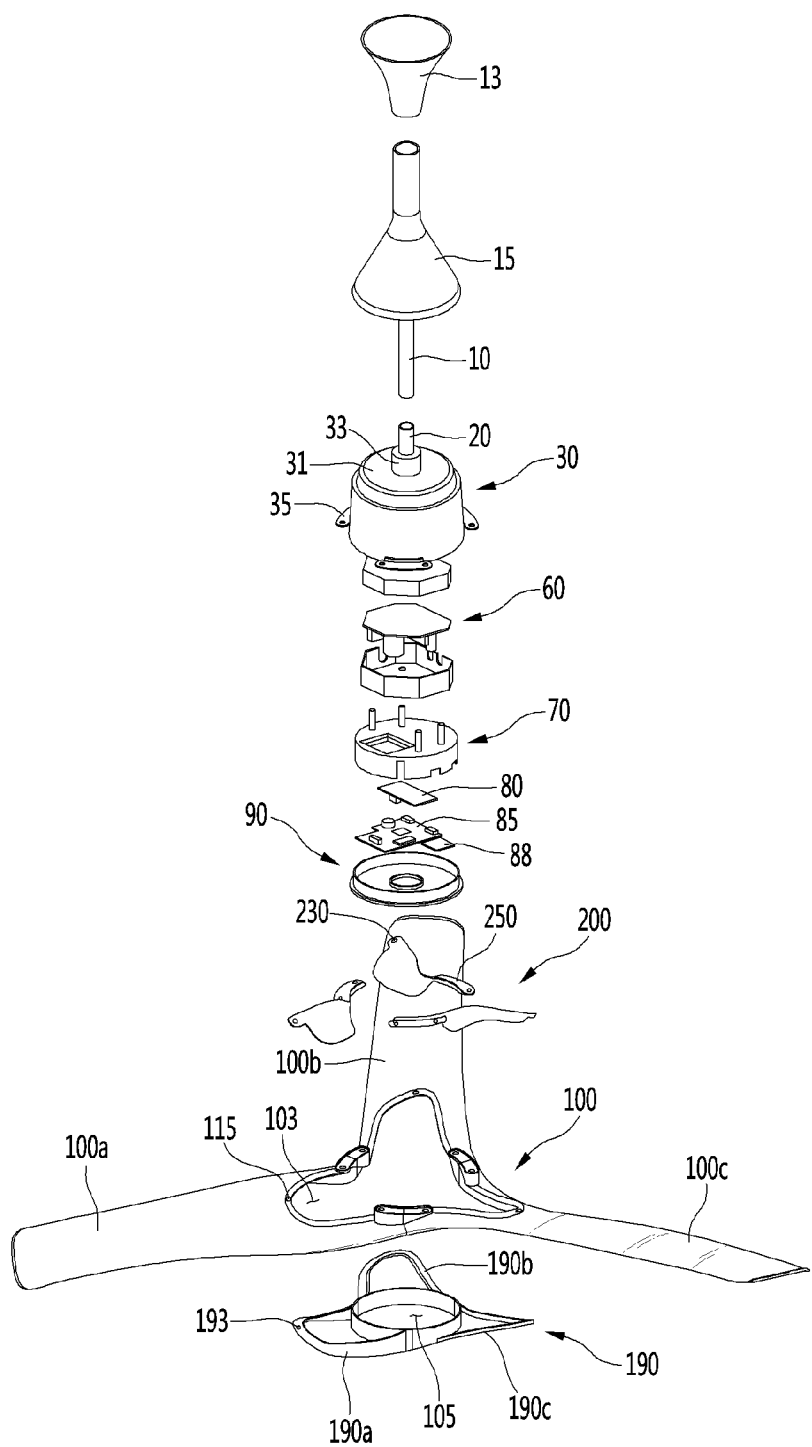
FIG. 2 is an exploded perspective view of the ceiling fan according to an embodiment of the present disclosure.
Figure 3:
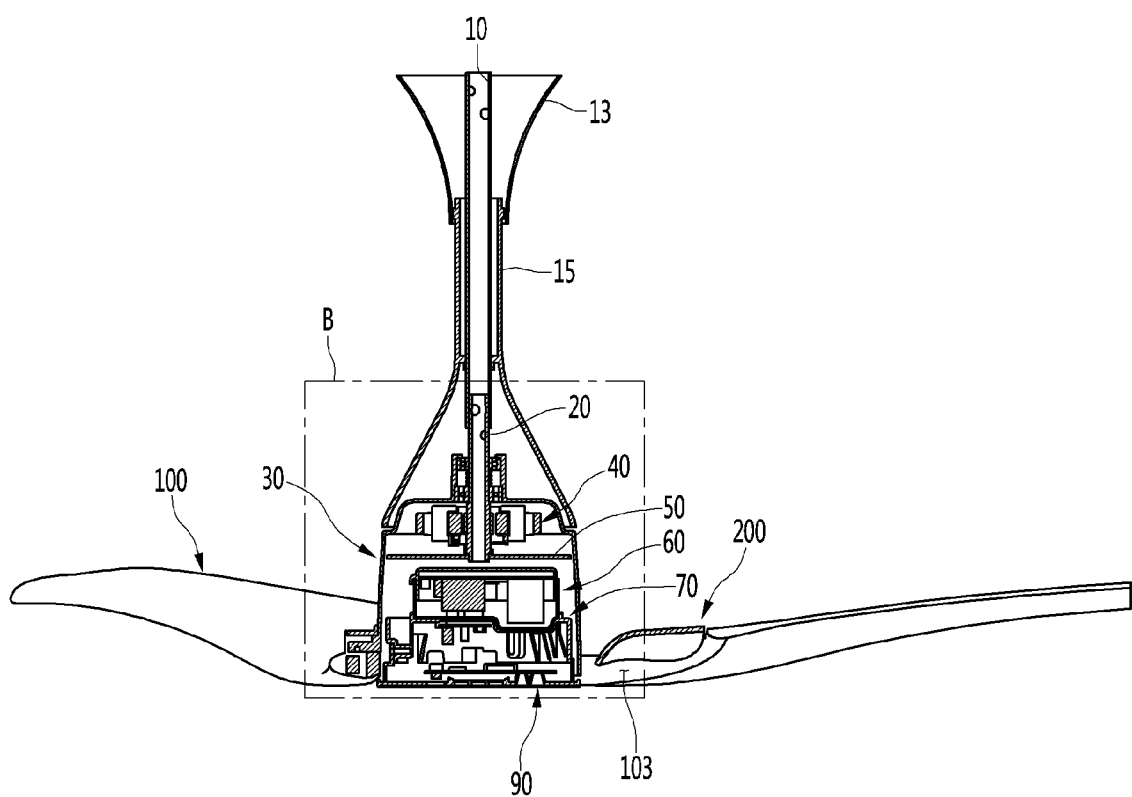
FIG. 3 is a sectional view taken along line A-A' of FIG. 1

FIG. 2 is an exploded perspective view of the ceiling fan according to an embodiment of the present disclosure, and FIG. 3 is a sectional view taken along line A-A' of FIG. 1.

Referring to FIGS. 2 and 3, the ceiling fan 1 according to an embodiment of the present disclosure may include a shaft 10 coupled to a ceiling or wall surface, and an upper cover 13 and a lower cover 15 to cover an outer portion of the shaft 10.

The upper cover 13 and the lower cover 15 may protect the shaft 10 from being exposed to the outside.

An upper end of the upper cover 13 makes contact with the ceiling or the wall surface and a lower end of the upper cover 13 is coupled to an upper end cover of the lower cover 15. For example, the upper cover 13 may be provided in the form of a funnel.

The lower cover 15 is coupled to a lower portion of the upper cover 13. In addition, the lower cover 15 may be formed integrally with the upper cover 13.

The upper end of the lower cover 15 may extend in the same direction of the extending direction of the shaft 10. In addition, the lower cover 15 may extend such that the inner diameter of the lower cover 15 is increased downward. For example, the lower cover 15 may be formed in a conical shape.

The lower cover 15 may cover an upper portion of a housing cover 30 to be described below. In addition, the lower cover 15 may be positioned to be spaced apart outward from the housing cover 30 by a predetermined distance.

The shaft 10 may be coupled to the ceiling or wall surface to provide fixing force. For example, the shaft 10 may be coupled to a predetermined coupling device provided on the concrete wall surface of the ceiling. Accordingly, a plurality of components coupled to the lower portion of the shaft 10 may be firmly fixed and supported.

The ceiling fan 1 may further include a motor shaft 20 coupled to the lower end of the shaft 10 and the housing cover 30 to cover an outer portion of the motor shaft 20.

The motor shaft 20 and the shaft 10 may be integrally coupled to each other to form the central axis of the ceiling fan 1. In addition, the motor shaft 20 is coupled to the shaft coupled to the ceiling, so a plurality of components coupled to the motor shaft 20 may be fixed.

The motor shaft 20 passes through the center of the housing cover 30 to extend downward. In other words, the motor shaft 20 may be positioned on the central axis of the housing cover 30.

Meanwhile, the shaft 10 and the motor shaft 20 may be formed integrally with each other, so the shaft 10 and the motor shaft 20 may be collectively referred to as shafts 10 and 20.

The housing cover 30 may form an internal space to receive a plurality of parts therein. The plurality of parts may include a motor assembly 40, a bridge support 50, a control assembly 60, a bridge case 70, and a display cover 90.

The housing cover 30 may have openings extending in a vertical direction. Accordingly, the motor shaft 20 may be positioned to be inserted into the upper portion of the housing cover 30 in the direction of the central axis, and the display cover 90 to be described may be positioned to be spaced apart inward from the lower end of the housing cover 30 and to face outward.

The housing cover 30 may include a cylindrical shape having upper and lower portions that are open.

The housing cover 30 may extend such that the diameter of the housing cover 30 is increased downward. In other words, an outer circumferential surface of the housing cover 30 may be expanded to the outside downward.

The housing cover 30 may include a blade connector 35 inserted into the main blade 100.

The blade connector 35 may be formed to protrude outward from the outer circumferential surface of the housing cover 30. For example, the blade connector 35 may be formed to extend in a radial direction from the lower end of the housing cover 30.

The blade connector 35 may guide a plurality of main blades 100 such that the plurality of main blades 100 are connected with or coupled to the blade connector 35. To this end, the blade connector 35 may have a plurality of holes.

Alternatively, the blade connector 35 may be formed corresponding to the number of the main blades 100. For example, when three main blades 100 are coupled to each other, three blade connectors 35 may be provided.

In this case, the blade connectors 35 may be arranged to have included angles equal to included angles formed among the three main blades 100 in a circumferential direction about the central axis.

In addition, the blade connector 35 is positioned at a point in which the two main blades 100 are coupled to each other, so the blade connector 35 may be inserted into each main blade 100.

The housing cover 30 may be positioned to be spaced apart from the lower end of the lower cover 15 by a predetermined distance.

In addition, the upper end of the housing cover 30 may be formed to have a diameter equal to a diameter of the lower end of the lower cover 15. Accordingly, the lower cover 15 and the housing cover 30 may provide a sense of unity and uniformity in the outer appearance.

In addition, the housing cover 30 may include a cover insertion part 31 spaced apart inward from the lower end of the lower cover 15 by a predetermined distance.

The cover insertion part 31 may constitute the upper portion of the housing cover 30. The cover insertion part 31 may extend such that the inner diameter of the cover insertion part 31 is reduced upward from the upper end of the housing cover 30. For example, the cover insertion part 31 may extend to be rounded upward. In other words, the cover insertion part 31 may be provided in a bowl form.

The cover insertion part 31 has a diameter smaller than the diameter of the upper end of the housing cover 30, so the cover insertion part 31 may be positioned to be inserted into the lower cover 15.

Accordingly, the housing cover 30 coupled to the blades 100 and 200 is disposed to be spaced apart from the lower cover 15 fixed to the ceiling, the mutual interference caused by the rotation of the blades 100 and 200 may be avoided.

In addition, the motor shaft 20 is prevented from being viewed from the outside, thereby providing a simple and neat design of the ceiling fan 1 for a user.

The cover insertion part 31 may include a shaft connection part 33 allowing the motor shaft 20 to pass therethrough and to be positioned.

The shaft connection part 33 may be formed such that the central portion of the cover insertion part 31 extends upward. In addition, the center of the shaft connection part 33 may include a hole to be open in the vertical direction. For example, the cover insertion part 33 may be provided in the form of a ring.

Accordingly, the motor shaft 20 may be inserted into the center of the cover insertion part 31. Accordingly, the motor shaft 20 may be positioned on the central axis of the housing cover 30.

The ceiling fan 1 may further include a motor assembly 40 to provide rotation power to the blades 100 and 200, a bridge support 50 coupled to the motor shaft 20 to expand a static installation space downward, and a control assembly 60 positioned under the bridge support 50.

The motor assembly 40 and the bridge support 50 may be positioned in an internal space of the housing cover 30. In addition, the motor assembly 40 and the bridge support 50 may be coupled to the motor shaft 20.

The motor assembly 40 may include an outer type of a motor. Accordingly, a stator of the motor may be coupled to and fixed to the motor shaft 20, and a rotor of the motor may be positioned outside the stator to rotate.

In addition, the housing cover 30 may be coupled to the rotor. Accordingly, the housing cover 30 may rotate together with the rotor.

The bridge support 50 may be coupled to and fixed to the lower end of the motor shaft 20.

The control assembly 60 may include a case and a main PCB. In addition, a plurality of electronic components may be provided in the control assembly 60 to perform the function of a control unit of the ceiling fan 1.

The ceiling fan 1 may further include a bridge case 70 positioned under the control assembly 60 and a display cover 90 positioned under the bridge case 70.

The bridge case 70 may be coupled to the bridge support 50 and the control assembly 60. Accordingly, the bridge case 70 may be fixed to a lower portion of the control assembly 60 to support the control assembly 60.

In other words, the control assembly 60 may be positioned between the bridge case 70 and the bridge support 50.

The display cover 90 may be coupled to a lower portion of the bridge case 70. In addition, electronic components performing various functions may be disposed in the display cover 90 and the bridge case 70.

The display cover 90 may be positioned at the lowermost central portion of the ceiling fan 1 to form a portion of an outer appearance of the ceiling fan 1.

In addition, the display cover 90 may provide visual information for the user positioned on the ground surface.

In addition, the display cover 90 may be positioned at a static position, which may be defined as a non-rotation position, instead of rotating together with the rotation of the blades 100 and 200, so the visibility of the user is improved.

The ceiling fan 1 may include a plurality of electronic components (modules) to provide the convenience of the user.

In detail, the ceiling fan 1 may further include an anti-bug module 80 to eliminate a pest, a display module 85 to perform a lighting function, and a communication module 88 to perform a communication function.

The anti-bug module 80, the display module 85, and the communication module 88 may be positioned in an internal space formed by the display cover 90 and the bridge case 70.

The display module 85 may include a lamp (LED) to provide a light and a display PCB to control the lamp.

The communication module 88 may wireless transmit or receive data. For example, the communication module 88 may include Wi-Fi.

The communication module 88 may be connected with various air conditioning products installed in the interior space. In addition, the ceiling fan 1 may be synchronized with another air conditioning product installed in the interior space and interwork with the another air conditioning product to operate in various modes, through the communication module 88. The communication module 88 may be installed in the display cover 90.

The ceiling fan 1 may further include the main blade 100 and the sub-blade 200 to receive power and to rotate.

A plurality of main blades 100 may be provided. For example, the main blade 100 may include a first main blade 100*a*, a second main blade 100*b*, and a third main blade 100*c*.

The first to third main blades 100*a*, 100*b*, and 100*c* may have the same structure. The first to third main blades 100*a*, 100*b*, and 100*c* may be coupled or assembled together at opposite ends thereof.

The first to third main blades 100*a*, 100*b*, and 100*c* may be coupled to each other to be integrated.

In this case, the central portion of the first to third main blades 100*a*, 100*b*, and 100*c* integrally coupled to each other may have holes 103 and 103 open in the vertical direction. For example, the holes 103 and 105 may include a hole open in the form of a roly-poly.

In addition, the holes 103 and 105 may be divided into a center hole 105 at which the display cover 90 is positioned and a blade hole 103 positioned at which the sub-blade 200, by a decoration cover 190.

The first to third main blades 100*a*, 100*b*, and 100*c* may be arranged to form a predetermined angle between adjacent main blades based on the central axis while longitudinally extending in the radial direction. For example, the predetermined angle may be 120°.

The main blade 100 may be formed therein with a main coupling hole 115 to be coupled to the sub-blade 200. The main coupling hole 115 may include a hole to be coupled to a coupling member.

The main coupling hole 115 may be positioned in the top surface (negative pressure surface) of the main blade 100. For example, the main coupling hole 115 may be formed in an incision part 110 formed along an inner edge of the main blade 100 adjacent to the blade hole 103.

The main blade 100 may include the decoration cover 190.

The decoration cover 190 may be inserted into the inner surface of the main blade 100. In addition, a plurality of decoration covers 190 may be provided corresponding to the main blades 100. For example, the decoration cover 190 may include a first decoration cover 190a inserted into the first main blade 100a, a second decoration cover 190b inserted into the second main blade 100b, and a third display cover 190c inserted into the third main blade 100c.

The plurality of decoration covers 190 may be coupled to each other while relying on the plurality of main blades 100.

The sub-blade 200 may be positioned in the blade hole 103. The sub-blade 200 may extend with a predetermined curvature.

In addition, the sub-blade 200 may be arranged to have an inclined angle different from that of the main blade 100. For example, the sub-blade 200 may include an extension surface to guide air to have an angle of attack different from that of the main blade 100

A plurality of sub-blades 200 may be provided corresponding to the number of the main blades 100.

The sub-blade 200 may include a sub-coupling hole 230 to be coupled to the main blade 100 and the decoration cover 190.

When the sub-blade 200 is mounted on the main blade 100, the sub-coupling hole 230 may be positioned corresponding to a main coupling hole 115. Accordingly, a coupling member inserted into the sub-coupling hole 230 may be coupled by passing through both a decoration coupling hole 193 and the main coupling hole 115.

The sub-coupling hole 130 may be formed in one end of the sub-blade 200. In addition, the sub-coupling hole 230 may be formed such that the sub-coupling hole 230 is seated above the main coupling hole 115.

In summary, when the sub-coupling hole 230 is coupled to the main blade 100, the sub-coupling hole 230 may be positioned to be aligned in line with the main coupling hole 115 and the decoration coupling hole 193.

The sub-blade 200 may include a sub-connector 250 to guide the coupling between the plurality of main blades 100.

The sub-blade 200 may be seated on the main blade 100 to correspond to the blade connector 35 in the vertical direction.

The sub-connector 250 may be formed at an opposite end of the sub-blade 200. For example, the sub-connector 250 may extend in the shape corresponding to that of the blade connector 35.

In addition, the sub-connector 250 may be seated at a position at which two main blades 100 are coupled to each other. For example, the sub-connector 250 may be seated at a position at which the first main blade 100a and the second main blade 100b are coupled to each other.

In addition, the sub-connector 250 may be formed therein with holes 255 and 256 corresponding to a plurality of holes 36 formed in the blade connector 35. In other words, when the housing cover 30 and the sub-blade 200 are coupled to the main blade 100, the sub-connector 250 and the blade connector 35 are disposed and aligned in the vertical direction such that the holes communicate with each other.

Similarly, a front connector hole 146 and a rear connector hole 156, which are aligned to communicate with the hole of the sub-connector 250, may be formed in the two main blades 100 coupled to each other, when the housing cover 30, the sub-blade 200, and the main blade 100 are coupled to each other.

Accordingly, when the sub-connector 250 is seated on the two main blades 100 coupled to each other, any one coupling member may pass through holes 255 and 256 of the sub-connector 250 to pass through the front connector hole 146 or the rear connector hole 156, and may be inserted into and coupled to the holes 36 of the blade connector 35.

Meanwhile, the control assembly 60, the bridge case 70, the display cover 90, and a plurality of modules 80, 82, and 88 may be defined as an electronic unit. In other words, the electronic unit may be understood as the feature of the ceiling fan 1 in which a plurality of electronic components are installed.

The electronic unit may be positioned in the internal space of the housing cover 30 and may be coupled to the lower portion of the motor shaft 20. Accordingly, the electronic unit may be stably fixed by the coupling force transmitted from the ceiling.

Meanwhile, an outer appearance of the ceiling fan 1 are simple and uniform because the ceiling fan 1 is provided such that only the upper cover 13, the lower cover 15, the housing cover 30, the display cover 90, the main blade 100, and the sub-blade 200 are exposed to the outside, thereby providing the esthetic sense for the user.

Figure 4:
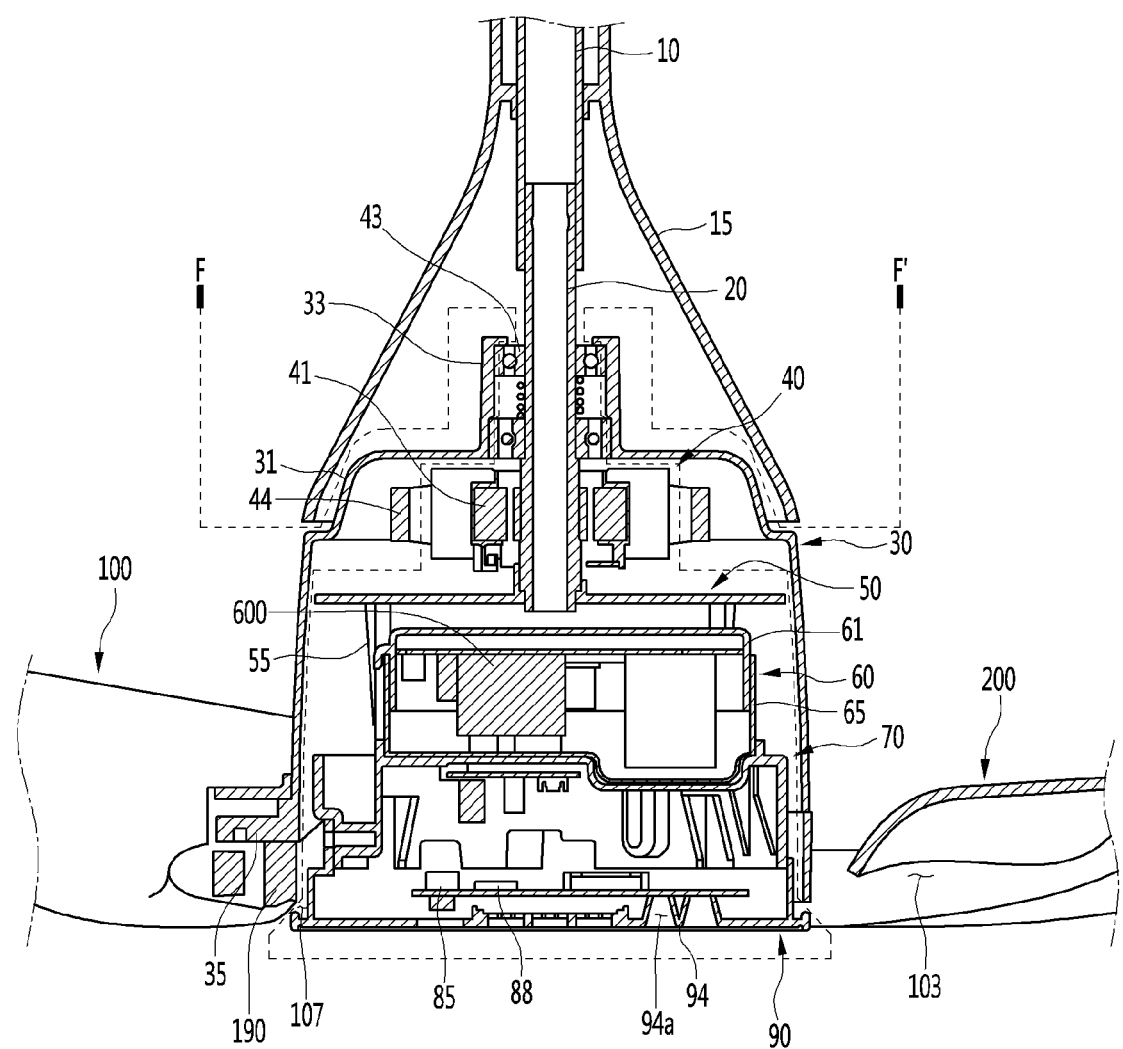
FIG. 4 is an enlarged sectional view illustrating part B of FIG. 3.
Figure 5:
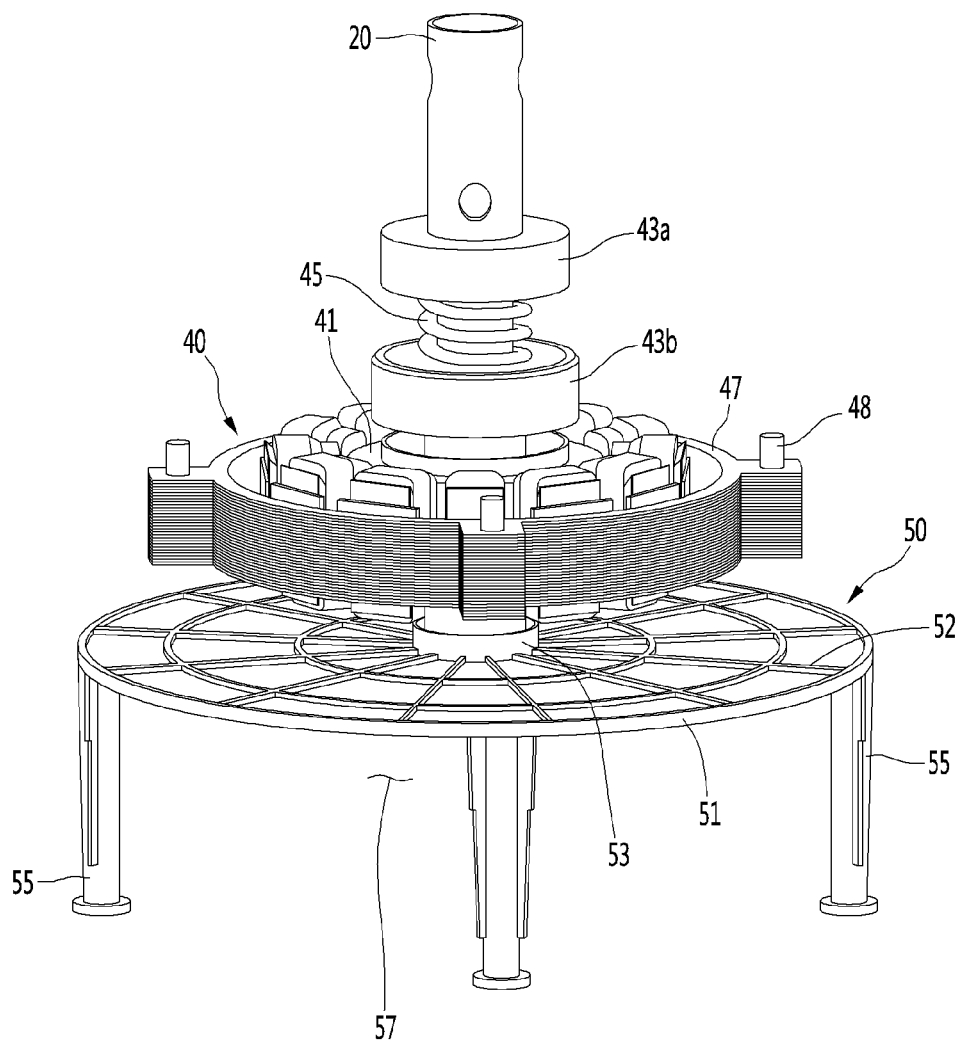
FIG. 5 is a perspective view illustrating the motor assembly and the bridge support coupled to each other according to an embodiment of the present disclosure.

FIG. 4 is an enlarged sectional view illustrating part B of FIG. 3, and FIG. 5 is a perspective view illustrating the motor assembly and the bridge support coupled to each other according to an embodiment of the present disclosure.

Referring to FIGS. 4 and 5, the motor assembly 40 may include a stator 41 coupled to the motor shaft 20, a bearing 43 to support the motor shaft 20 and the housing cover 30, a spring 45 positioned in the bearing 43, and a rotor 47 coupled to the housing cover 30.

The stator 41 may include a core disposed radially outward and a motor shaft coupling hole formed in the central portion thereof to be coupled to the motor shaft 20.

A coil (not illustrated) wound around the core.

The motor shaft coupling hole may be engaged with the motor shaft 20. Accordingly, the stator 41 may be fixed by the motor shaft 20.

The rotor 47 may be positioned to be spaced apart outward from the outer circumferential surface of the stator 41. In addition, the rotor 47 may have the form of a ring having a concentric circle.

The rotor 47 may include a frame extending while being spaced apart from the outer circumferential surface of the stator 41 by a predetermined distance, and a york piece and a magnet mounted on an inner circumferential surface of the frame.

In addition, the rotor 47 may be disposed to be spaced apart from the inner circumferential surface of the housing cover 30. In detail, the inner circumferential surface of the housing cover 30 may be disposed to be spaced apart radially from the radius of rotation of the rotor 47.

The rotor 47 may further include a cover coupling part 48 coupled to the housing cover 30.

The cover coupling part 48 may be formed to protrude from the top surface of the rotor 47. A plurality of cover coupling parts 48 may be provided. For example, the plurality of cover coupling parts 48 may be arranged at a predetermined distance along the outer portion of the rotor 47.

The cover coupling part 48 may guide the housing cover 30 such that the housing cover 30 is coupled to an upper portion of the cover coupling part 48. For example, the cover coupling part 48 may be coupled as an upper end, which is formed to protrude, of the cover coupling part 48 may be inserted into the inner circumferential surface of the cover insertion part 31.

In more detail, the cover coupling part 48 may include a protrusion part formed to protrude in a radial direction from the outer circumferential surface of the frame and an insertion rod extending upward from the top surface of the protrusion part.

A plurality of protrusion parts may be provided while being spaced apart from each other by a predetermined distance along a circumferential direction in which the frame extends, and the insertion rod may extend upward from the respective protrusion part.

The insertion rod may be formed in the shape of a cylinder having a thread formed along the circumferential surface thereof. In this case, the cover insertion part 31 of the housing cover 30 may be formed in an inner surface thereof with a coupling groove coupled to the insertion rod in the shape corresponding to the shape of the insertion rod.

Accordingly, as the cover insertion part 31 constituting the upper portion of the housing cover 30 is coupled to the cover coupling part 48 of the rotor 47, the load of the motor assembly 40 installed on the ceiling may be more stably supported.

The rotor 47 may rotate together with the stator 41 through mutual electromagnetic action. In this case, the housing cover 30 coupled to the rotor 47 may rotate together with the rotor 47.

In other words, the rotation power generated by the rotor 47 may be transmitted to the main blade 100 and the sub-blade 200 through the housing cover 30.

The bearing 43 may be positioned above the central portion of the stator 41. The bearing 43 may be formed to surround the motor shaft 20

The bearing 43 may support the motor shaft 20. The motor shaft 20 may be understood as a rotation central axis of the motor assembly 40. However, the motor shaft 20 is fixedly coupled from the ceiling, so the motor shaft 20 is static.

The bearing 43 may perform a function of fixing the motor shaft 20 to a predetermined position. The bearing 43 may perform a function of supporting the housing cover 30 and a plurality of blades 100 and 200 coupled to the housing cover 30.

The bearing 43 may be coupled to the housing cover 30 at the outside. For example, the bearing 43 may be rotatably coupled to the shaft connection part 33 formed at the central portion of the cover insertion part 31.

In other words, the bearing 43 may perform a function of reducing the friction with the motor shaft 20 due to the rotation of the housing cover 30. For example, the bearing 43 may include a ball bearing.

The bearing 43 may include an upper bearing 43a and a lower bearing 43b.

The spring 45 may be positioned between the upper bearing 43a and the lower bearing 43b. The motor shaft 20 may be fitted into the center of the spring 45.

The spring 45 may perform a stopper function of the upper bearing 43a and the lower bearing 43b. Accordingly, the load of the motor assembly 40 coupled and supported from the ceiling may be more stably supported.

The display cover may be coupled to a lower portion of the motor shaft 20.

In addition, the bridge support 50 may include a support plate 51 and a bridge 55 extending downward from the support plate 51.

The bridge support 51 may be coupled to and fixed to the lower end of the motor shaft 20. In addition, the support plate 51 may extend in a radial direction from the center of the motor shaft 20.

The support plate 51 may be formed to have an outer diameter greater than an outer diameter of the rotor 47. For example, the support plate 51 may have the shape of a disc.

The support plate 51 may include a shaft insertion part 53 to guide the coupling to the motor shaft 20 and a plurality of reinforcement ribs 52 to maintain the stiffness of the support plate 51.

The shaft insertion part 53 may be positioned at the center of the support plate 51. In addition, the shaft insertion part 54 may be formed in the center thereof with a hole into which the motor shaft 20 is inserted. For example, the motor shaft 20 may be inserted into the hole of the shaft insertion part 53 and coupled to the insertion part 53.

The reinforcement rib 52 may be formed on the top surface of support plate 51. For example, the reinforcement ribs 52 may be formed extend in a radial direction and a circumferential direction from the shaft insertion part 53.

The bridge 55 may be formed to extend downward from the bottom surface of the support plate 51.

In addition, the bridge 55 may extend such that the diameter of the bridge 55 is reduced downward. In addition, the bridge 55 may be formed on the outer circumferential surface thereof with a plurality of ribs to maintain the stiffness of the bridge 55.

A plurality of bridges 55 may be provided. For example, the plurality of bridges 55 may be positioned to be spaced apart from each other in the circumferential direction on an outer end of the support plate 51.

In other words, the plurality of bridges 55 may extend downward along the outer circumference of the support plate 51 while being perpendicular to the bottom surface of the support plate 51. Accordingly, the plurality of bridges 55 may form a receiving space 57, in which the control assembly 60 is positioned, therein.

The bridge 55 may guide to form a static receiving space fixed under the motor shaft 20 in the internal space of the housing cover 30.

In addition, the bridges 55 may expand the installation space such that a plurality of electronic components are installed under the motor shaft 20. Accordingly, the plurality of electronic components may be maintained at a fixed position without rotating, independently from the rotation of the ceiling fan 1.

The bridge 55 may be inserted into a bridge hole 71 provided in the bridge case 70. In addition, the bridge 55 inserted into the bridge hole 71 may be coupled by the coupling member. Accordingly, the bridge support 50 and the bridge case 70 may be coupled to each other to be firmly fixed.

In accordance with another aspect, according to an embodiment of the present disclosure, a ceiling fan may include a fixing unit which is a static component and a rotating unit which is a dynamic component.

The fixing unit may be named a non-rotation unit.

Referring to dotted line F1-F1' for distinguishing between the fixing unit and the rotation unit in FIG. 4, the fixing unit may include the shaft 10 coupled to the ceiling, the upper cover 13, the lower cover 15, the motor shaft 20, the stator 41, the bridge support 50, the control assembly 60, the bridge case 70, a plurality of modules 80, 85, 88, and the display cover 90.

In addition, the rotation unit may include the housing cover 30, the main blade 100, and the sub-blade 200.

In the ceiling fan 1 according to an embodiment of the present disclosure, since the number of components (rotation unit) rotating is more reduced as compared to the conventional ceiling fan, the volume of air discharged may be increased when the ceiling fan 1 provides the same amount of rotation power as that the conventional ceiling fan, and the rotation power may be more reduced when the same air volume is provided, thereby reducing power consumption.

In addition, the fixing unit and the rotation unit may be formed to provide the sense of unity in the outer appearance structure viewed by a user. For example, the housing cover 30 may extend downward to be formed such that the upper end diameter of the housing cover 30 is equal to the lower end diameter of the lower cover 15. The display cover 90 may be formed to have a lower end diameter that is equal to the central diameter defining the center hole 105 in the decor cover 190 or the lower end diameter of the housing cover 30.

In addition, the fixing unit and the rotation unit may have a gap 107 therebetween to avoid the friction therebetween even though the fixing unit and the rotation unit provide the sense of unity in the outer appearance.

In detail, the lower end and the inner surface of the row cover 15 may be spaced apart from the housing cover 30 by a predetermined distance as described above. The lower end of the display cover 90 may be spaced apart from the lower ends of the decoration cover 190 and the housing cover 30 by forming a gap 107 outward. Accordingly, a connection portion may be minimized between the rotation unit rotating and the fixing unit having a statically fixed position, thereby reducing the frication noise.

In addition, components constituting the rotation unit may be coupled to each other such that a gap is formed therebetween.

In detail, the main blade 100 may be coupled to the decoration cover 190 to form a predetermined gap together with the decoration cover 190. For example, the main blade 100 may include a plurality of dummy holes or dummy grooves that the decoration cover 190 does not reach such that the gap is formed in the decoration groove to define the recessed space for inserting the decoration cover 190.

In detail, the main blade 100 may be coupled to the blade connector 35 of the housing cover 30 to form a gap together with the blade connector 35. Accordingly, the frictional noise caused by the coupling state between components in the rotation unit rotating may be more reduced.

Meanwhile, the force for rotating the rotation unit may be generated by the rotation of the rotor 47. In addition, the force for rotating the rotation unit is transmitted to the housing cover 30 coupled to the rotor 47, the main blade 100 coupled to the housing cover 30, and the sub-blade 200 coupled to the main blade 100 to rotate the rotation unit.

In addition, the fixing unit may be stably fixed by the shaft 10 coupled to the ceiling or the wall surface. In detail, in the shaft 10, the motor shaft 20 may stably fix the bridge support 50 coupled to the lower portion of the motor shaft 20 and the electronic components 60, 70, 80, 85, 88, and 90 coupled to the bridge support 50.

Figure 6:
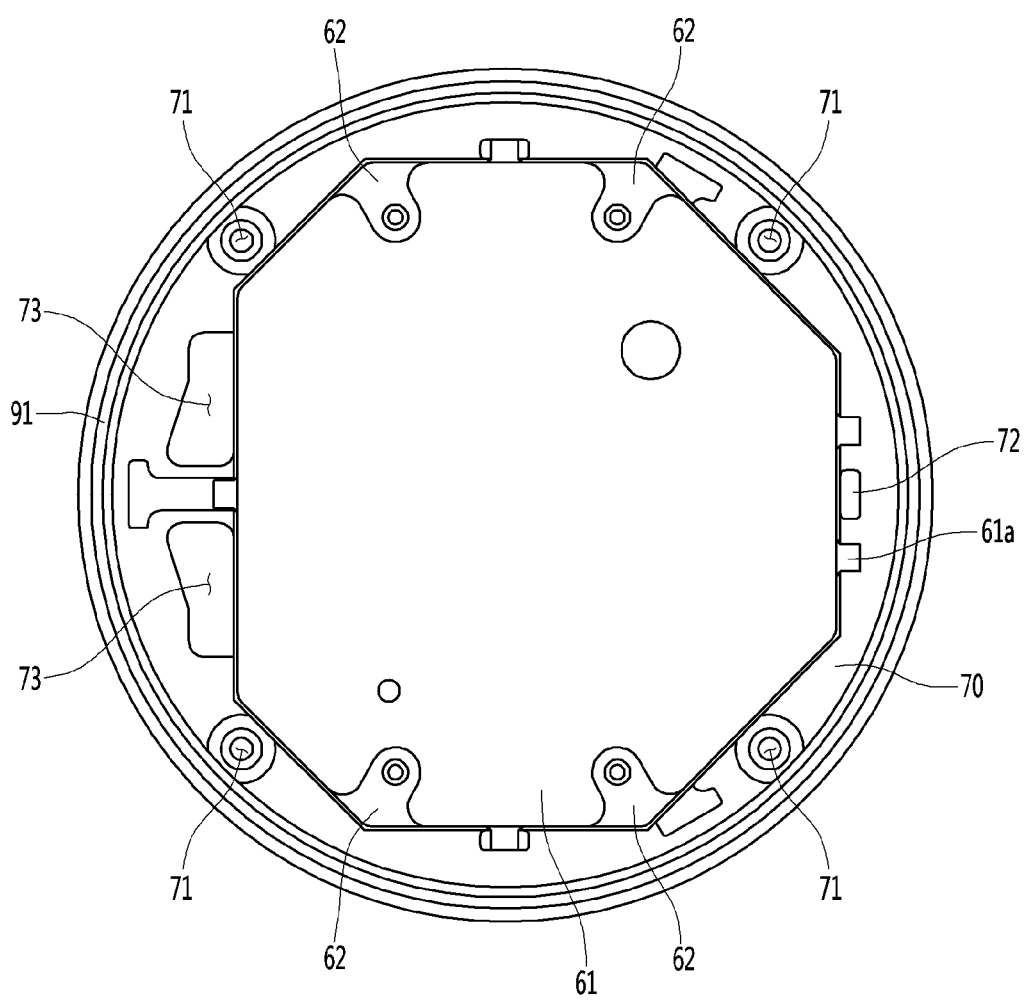
FIG. 6 is a plan view of the electronic unit when viewed from above according to an embodiment of the present disclosure.
Figure 7:
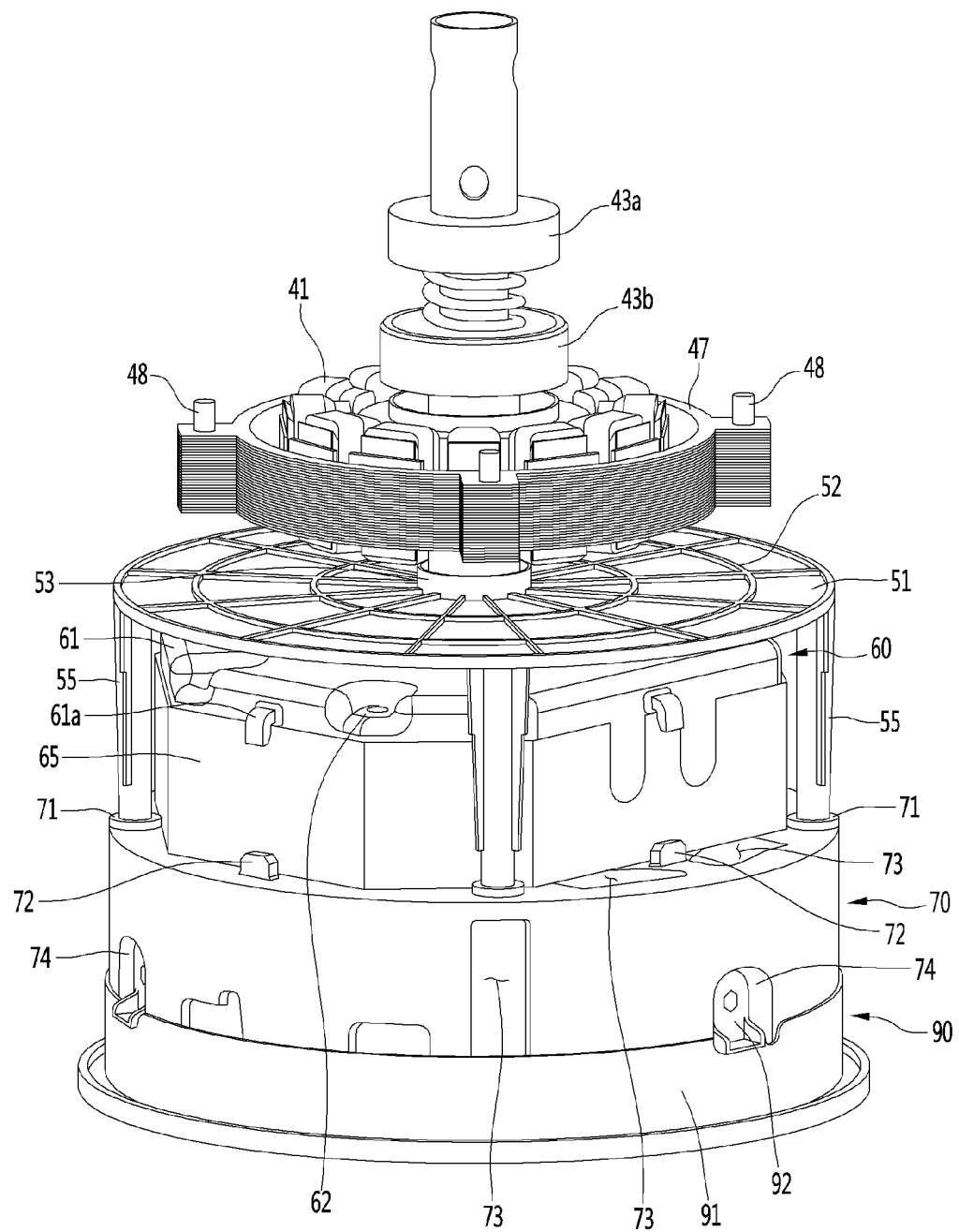
FIG. 7 is a perspective view illustrating the motor assembly, the bridge support, and the electronic unit coupled to each other according to an embodiment of the present disclosure.

FIG. 6 is a plan view of the electronic unit according to an embodiment of the present disclosure when viewed from above, and FIG. 7 is a perspective view illustrating the motor assembly, the bridge support, and the electronic unit coupled to each other according to an embodiment of the present disclosure.

Referring to FIGS. 6 and 7, the control assembly 60 may include an upper control case 61 and a lower control case 65 assembled together in the vertical direction to seal the internal space.

A plurality of electronic components to control the ceiling fan 1 may be installed in the internal space formed by the upper control case 61 and the lower control case 65. In other words, the upper control case 61 and the lower control case 65 may shield the plurality of electronic components from the outside.

A plurality of holes may be formed in the upper control case 61 and the lower control case 65 to discharge heat emitted from the plurality of electronic components installed in the internal space. The hole may include a harness hole allowing an electric wire to pass therethrough.

The upper control case 61 and the lower control case 65 perform a function of suppressing Electro Magnetic Interference (EMI) caused by the plurality of electronic components installed in the internal space. In other words, the upper control case 61 and the lower control case 65 may prevent signal reception of electronic components, which are installed at different positions, from being failed due to unnecessary electromagnetic signals or electromagnetic noise generated from the plurality of electronic components installed in the internal space.

The upper control case 61 may be formed in a polygonal shape opening downward. The lower control case 65 may be formed in a polygonal shape opening upward.

The upper control case 61 and the lower control case 65 may be formed in shapes corresponding to each other. Therefore, the upper control case 61 may cover the upper portion of the lower control case 65.

The upper control case 61 may include a fixing groove 62 to guide the coupling with the bridge case 70 and a locking protrusion 61a to guide the coupling with the lower control case 65.

A plurality of fixing grooves 62 may be formed in the top surface of the upper control case 61. For example, the fixing groove 62 may be recessed downward from the top surface of the upper control case 61. The fixing groove 62 may have a hole bored downward.

The fixing grooves 62 may be formed corresponding to the number of inner bridges extending upward from the top surface of the bridge case 70. For example, an inner bridge of the bridge case 70 is inserted into the hole formed in the fixing groove 62, and a separate coupling member is coupled to the fixing groove 62, thereby coupling the control assembly 60 to the bridge case 70.

The locking protrusion 61a may protrude from the upper end of the upper control case 61. In other words, the locking protrusion 61a may extend from the side surface of the upper control case 61 in the radial direction and be bent.

The locking protrusion 61a may be formed in a ring shape. For example, the locking protrusion 61a may be formed in a substantially inversed L shape such that a groove is formed inward.

The upper end of the lower control case 65 may be locked to the locking protrusion 61a. That is, the upper control case may cover the lower control case 65 to meet the inner surface of the lower control case 65.

The upper ends of the lower control case 65, which has the open top surface, may be inserted into the locking protrusion 61a.

The lower control case 65 may be seated on the top surface of the bridge case 70.

The bridge case 70 may include a cylindrical shape having a bottom surface that is open.

The bridge case 70 may include a bridge hole 71, into which the bridge 55 is inserted, a seating rib 72 to guide the control assembly 60 such that the control assembly 60 is seated, a harness hole allowing an electric wire, which connects a plurality of electronic components with each other, to pass therethrough, and an insertion groove 74 to guide the coupling to the display cover 90.

The bridge hole 71 may be positioned in the top surface of the bridge case 70 such that the bridge 55 provided in the bridge support 50 is inserted into the bridge hole. For example, the bridge holes 71 may be formed at positions corresponding to a plurality of bridges 55.

In other words, a plurality of bridge holes 71 may be formed in the upper end of the bridge case 70 to be spaced apart from each other by a predetermined distance in the circumferential direction. In addition, the bridge hole 71 may be formed by boring the top surface of the bridge case 70 downward.

The plurality of bridges 55 are inserted into the plurality of bridge holes 71, respectively, and each bridge 55 and the respective bridge hole 71 are coupled with each other by a separate coupling member to fix the bridge 55 and the bridge hole 71, thereby coupling the bridge support 50 to the bridge case 70.

The seating rib 72 may be formed to protrude upward from the top surface of the bridge case 70.

A position, at which the bottom surface of the control assembly 60 is seated, may be defined by the seating rib 72.

A plurality of seating ribs 72 may be provided, and may be positioned such that the lateral side of the lower control case 64 is inserted.

Harness holes 73 may be formed in the top surface and the lateral side of the bridge case 70. A plurality of electronic components installed in the internal space formed by the display cover 90 and the bridge case 70 may be electrically connected with other electronic components positioned in the control assembly 60 through the harness hole 73.

The insertion groove 74 may be formed in the lateral side of the bridge case 70. For example, the insertion groove 74 may include a groove recessed inward from a lower end of the lateral side of the bridge case 70. In addition, the insertion groove 74 may include a coupling hole into which the coupling member is inserted and coupled.

The insertion groove 74 may guide the coupling of the display cover 90. In other words, the display cover 90 may be fixed through the insertion groove 74.

Meanwhile, the display cover 90 may be coupled to a lower portion of the bridge case 70. For example, the lower end of the bridge case 70 may be seated inside the display cover 90.

In addition, the display cover 90 may include a cover extension part 91 extending perpendicularly upward from the lower end thereof.

The cover extension part 91 may extend along the outer circumference of the display cover 90, that is, in a circumferential direction of the display cover 90. Accordingly, the cover extension part 91 may have an internal space such that a plurality of electronic components are installed in the display cover 90.

The cover extension part 91 may include a coupling guide 92 to guide the coupling to the bridge case 70.

A plurality of coupling guides 92 may be provided. In addition, the plurality of coupling guides 92 may be positioned at the upper end of the cover extension part 91 while being spaced apart from each other in the circumferential direction.

The coupling guide 92 may be formed to protrude upward from the upper end of the cover extension part 91. In addition, the coupling guide 91 may extend inward from a portion of the upper end of the control assembly 60 perpendicularly to the upper end of the control assembly 60 and may be bent perpendicularly from the inward extending end to extend upward. For example, the coupling guide 92 may extend upward in the shape of "L" bent and extending.

Since the coupling guide 92 is mounted in the insertion groove 74, the coupling guide 92 may be formed to correspond to the insertion groove 74. In other words, the plurality of coupling guides 92 may be formed to correspond to positions at which the insertion grooves 74 are formed. In addition, the coupling guide 92 may be formed in the shape corresponding to the shape of the insertion groove 74 such that the coupling guide 92 is inserted and mounted in the insertion groove 94.

The coupling guide 92 may have a coupling hole formed therein. In addition, the coupling hole may be positioned to correspond to the coupling hole formed in the insertion groove 74. Therefore, the display cover 90 and the bridge case 70 may be coupled as a separate coupling member is coupled to the coupling holes formed in the coupling guide 92 and the insertion groove 74.

The electronic components 60, 70, 80, 85, 88, and 90 may be formed in a multi-floor. In detail, the electronic unit may include a two-stage electronic unit. The electronic unit at a lower floor may be formed in the internal space shielded by the display cover 90 and the bridge case 70. In addition, the electronic unit at a higher floor may be formed in the internal space shielded by the coupling of the upper control case 61 and the lower control case 65.

Accordingly, the problem, such as above-described EMI, caused by the installed electronic components may be easily solved.

In addition, according to the multi-stage electronic unit, a control component may be disposed in an electronic unit relatively close to the position of any one component requiring the electrical connection. Accordingly, since wire connection is shortened and easy, the ratio of the wire occupying the space may be relatively reduced, and the space may be neat.

In addition, as a plurality of harness holes are formed, the user may easily perform wire connection work.

The bridge support 50 positioned under the motor assembly may form an internal space 57, in which the control assembly 60 is positioned, while being coupled to the bridge case 70 such that the multi-stage electronic unit is formed.

Accordingly, the installation space in which the fixing unit is installed may be expanded, and the space for the static component, that is, the non-rotation installation space may be ensured.

In other words, the bridge support 50 and the bridge case 70 serve as a bridge to stably fix and link the space in which a plurality of electronic components are installed.

As described above, according to the conventional ceiling fan, the rotating blade, and the upper and lower components are integrally coupled to each other. Accordingly, lower components within the field of view (vision range) of the user rotate together with the blade. Therefore, according to the conventional ceiling fan, it is difficult to provide visual information to the user through the lower component.

In addition, in the conventional ceiling fan, since the number of components rotating together is relatively increased, the vibration and the noise are relatively increased, and greater rotation power has to be provided from the motor.

In addition, in the conventional ceiling fan, since a lower portion thereof is integrally coupled to the rotation part, components disposed in the lower portion may not be stably fixed.

Accordingly, in the conventional ceiling fan, a load has to be restricted for safety. In addition, the space of the conventional ceiling fan is insufficient to install electronic components to provide various convenience functions. In addition, the conventional ceiling fan is restricted in terms of position due to rotation.

However, according to an embodiment of the present disclosure, the ceiling fan 1 may include a fixing unit stably fixed by maintaining the coupling force from the ceiling and a rotating unit spaced apart from the fixing unit and including only essential components to rotate the blades 100 and 200.

Accordingly, even if the number of components included in the rotating unit is relatively reduced to slightly provide the rotation power, the air may be provided in equal volume or more.

In addition, the fixing unit is formed toward the central axis. Accordingly, a plurality of electronic components (electronic unit), which are used to provide the convenience of a user, of components of the ceiling fan 1 corresponding to the field of view of the user may be installed in a more expanded space.

In addition, the ceiling fan 1 may position the plurality of electronic components capable of providing various conveniences of the user at the lower portion of the motor assembly 40 and fix the electronic components not to be rotated.

In other words, since positions of the plurality of electronic components (electronic unit) are fixed without the influence by the rotation of the blades 100 and 200, the visual information may be provided to the user.

In addition, the plurality of electronic components (electronic unit) may be more stably and fixedly fixed to the lower portion of the motor assembly 40, so the allowable load value range may be increased.

In addition, the user facing the ceiling from the floor of the room may provide the readability and visibility for the operating information of the ceiling fan 1 since the display cover 90 is maintained at a fixed position without rotating.

In addition, the blade connector 35, the main blade 100, and the sub-blade 200 of the housing cover 30 corresponding to the rotating unit are coupled to each other to form a predetermined gap therebetween, so the noise caused by the fiction of the rotating unit may be reduced.

Figure 8:
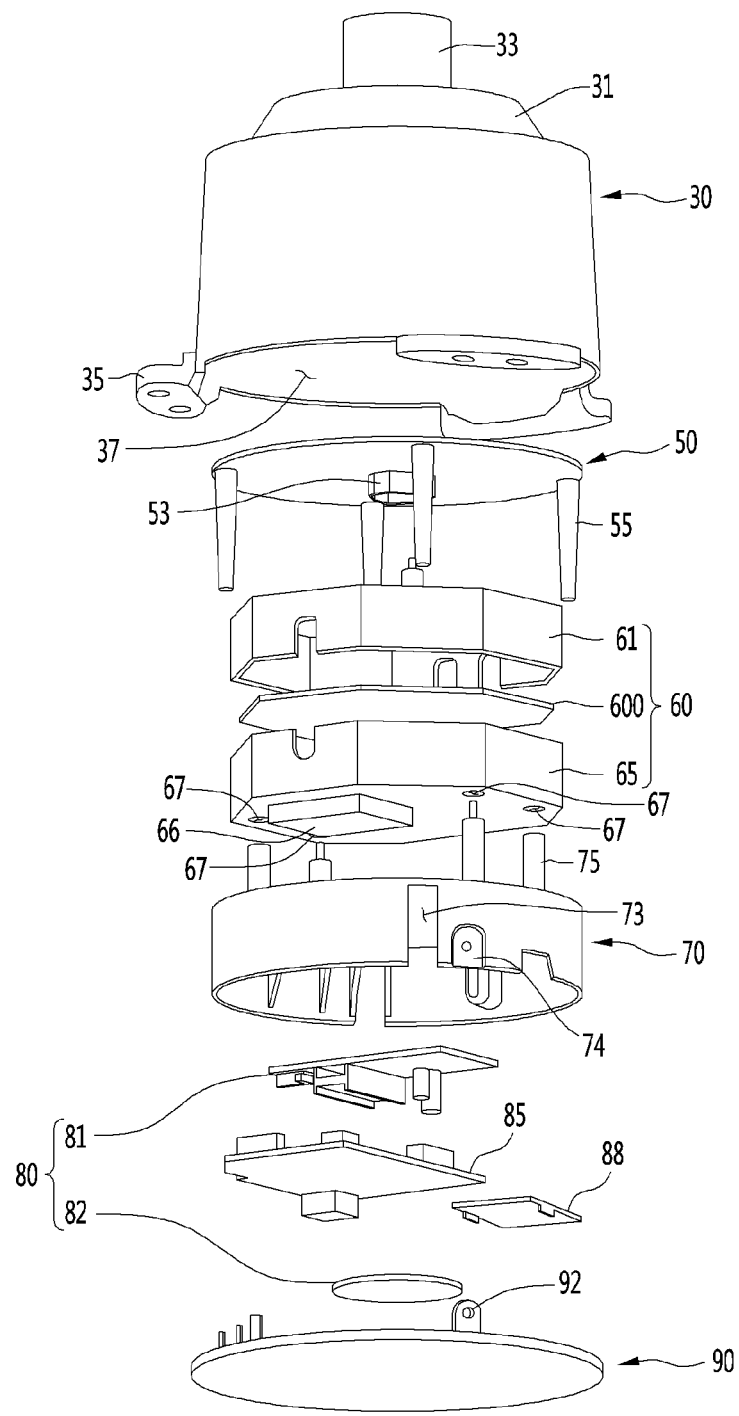
FIG. 8 is an exploded perspective view of components received in the housing cover, according to an embodiment of the present disclosure.
Figure 9:
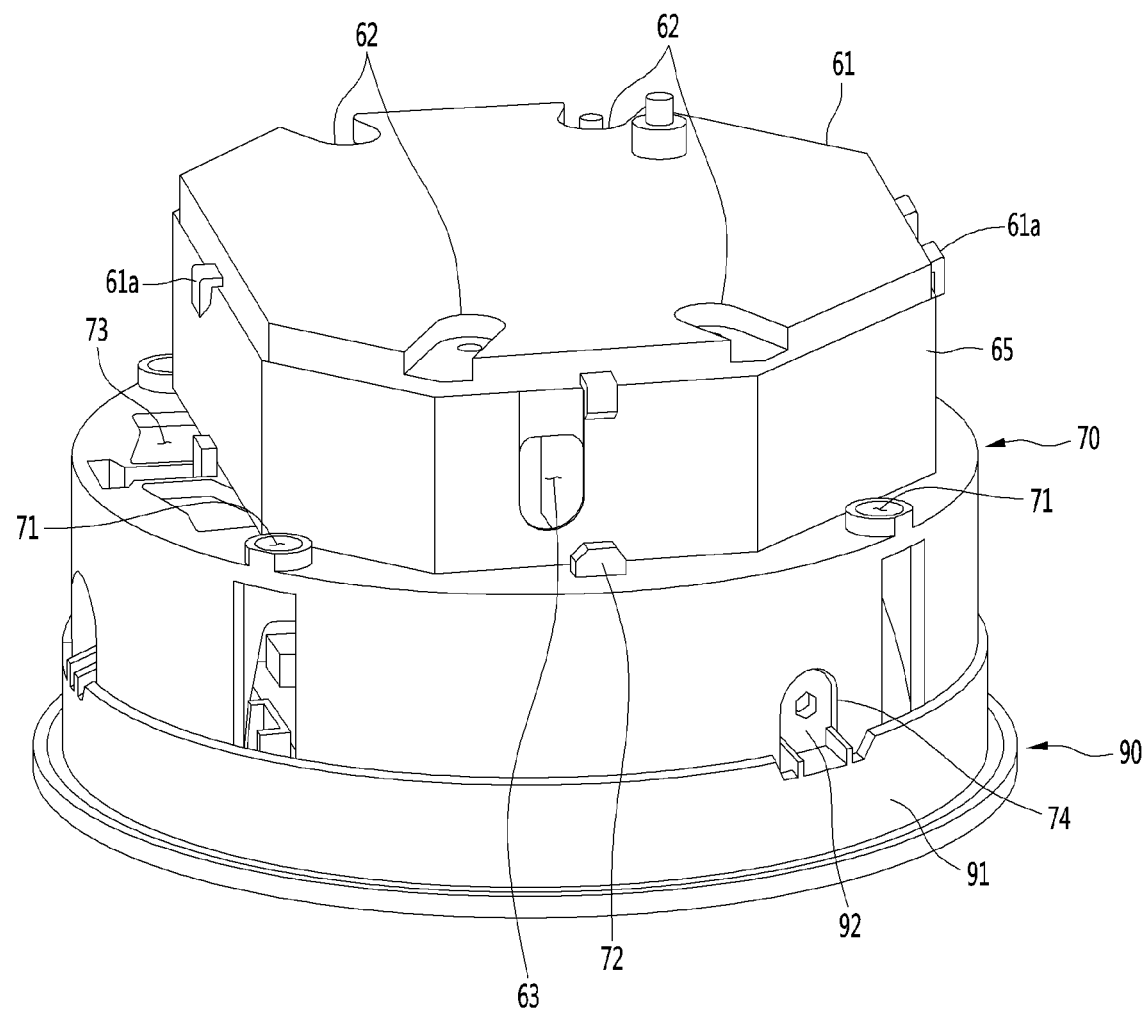
FIG. 9 is a perspective view illustrating the assembling of the electronic unit according to an embodiment of the present disclosure.
Figure 10:
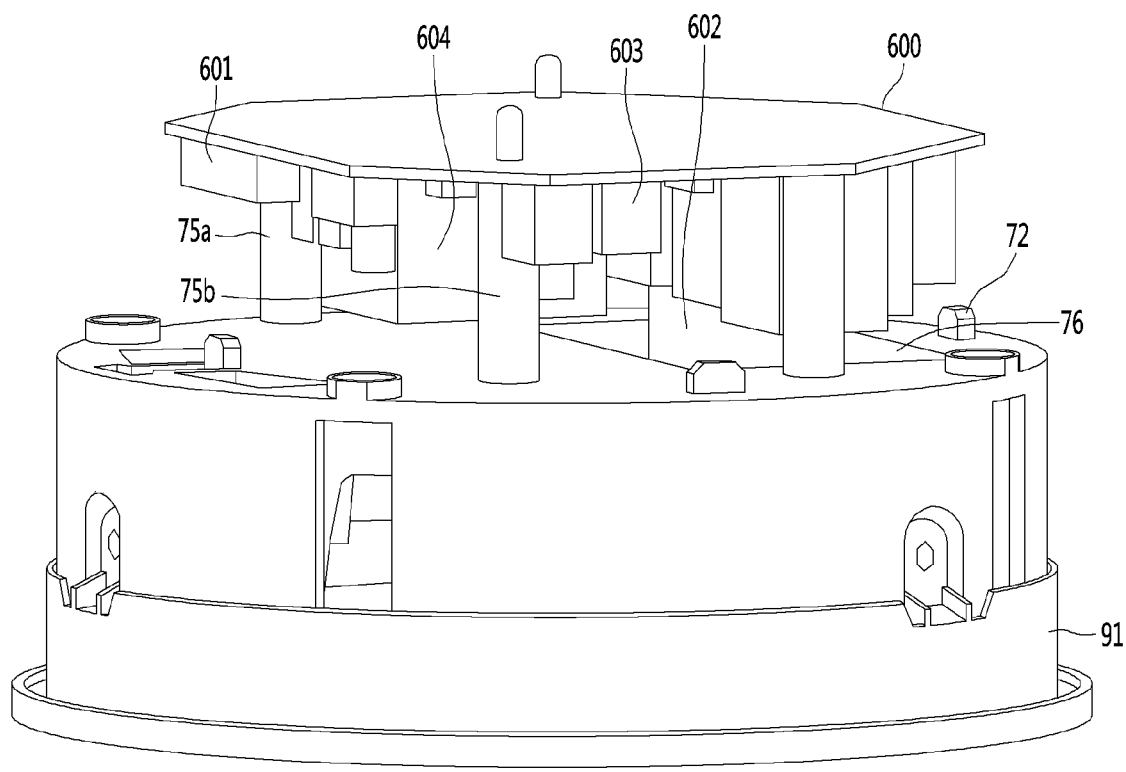
FIG. 10 is a perspective view illustrating that some components of FIG. 9 are removed.
Figure 11:
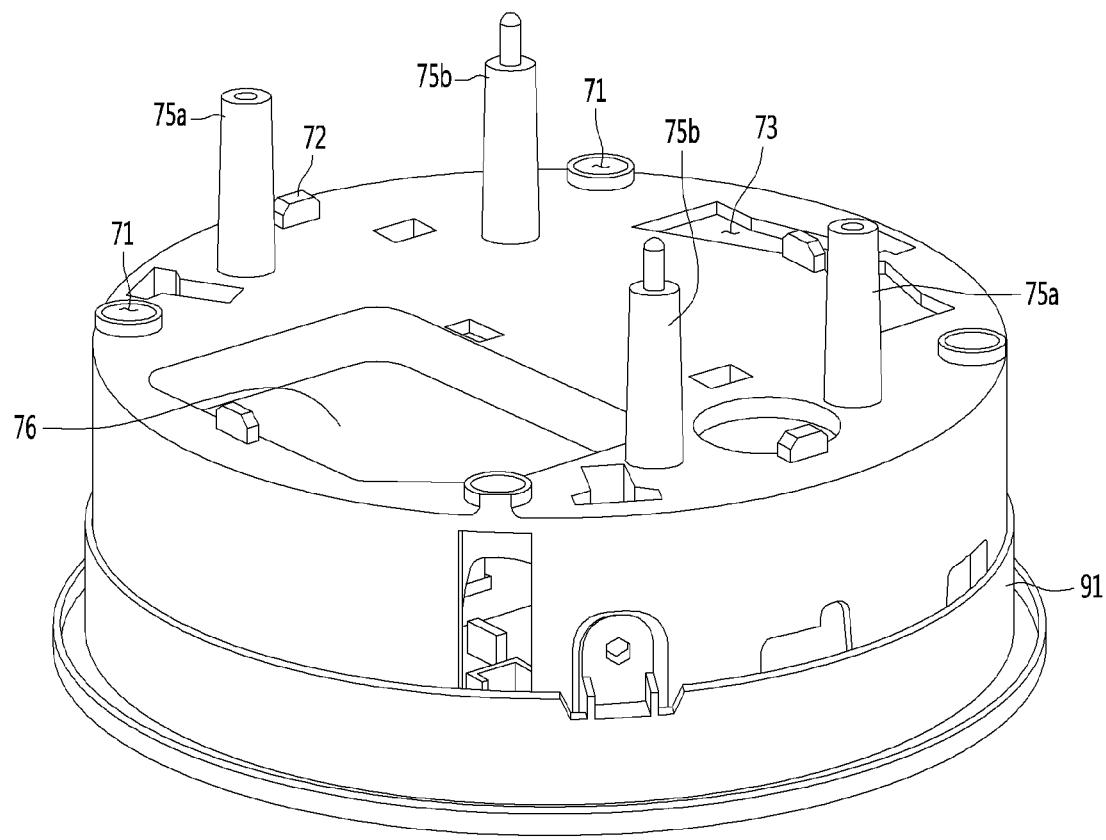
FIG. 11 is a perspective view that the display cover and the bridge case are coupled to each other according to an embodiment of the present disclosure.
Figure 12:
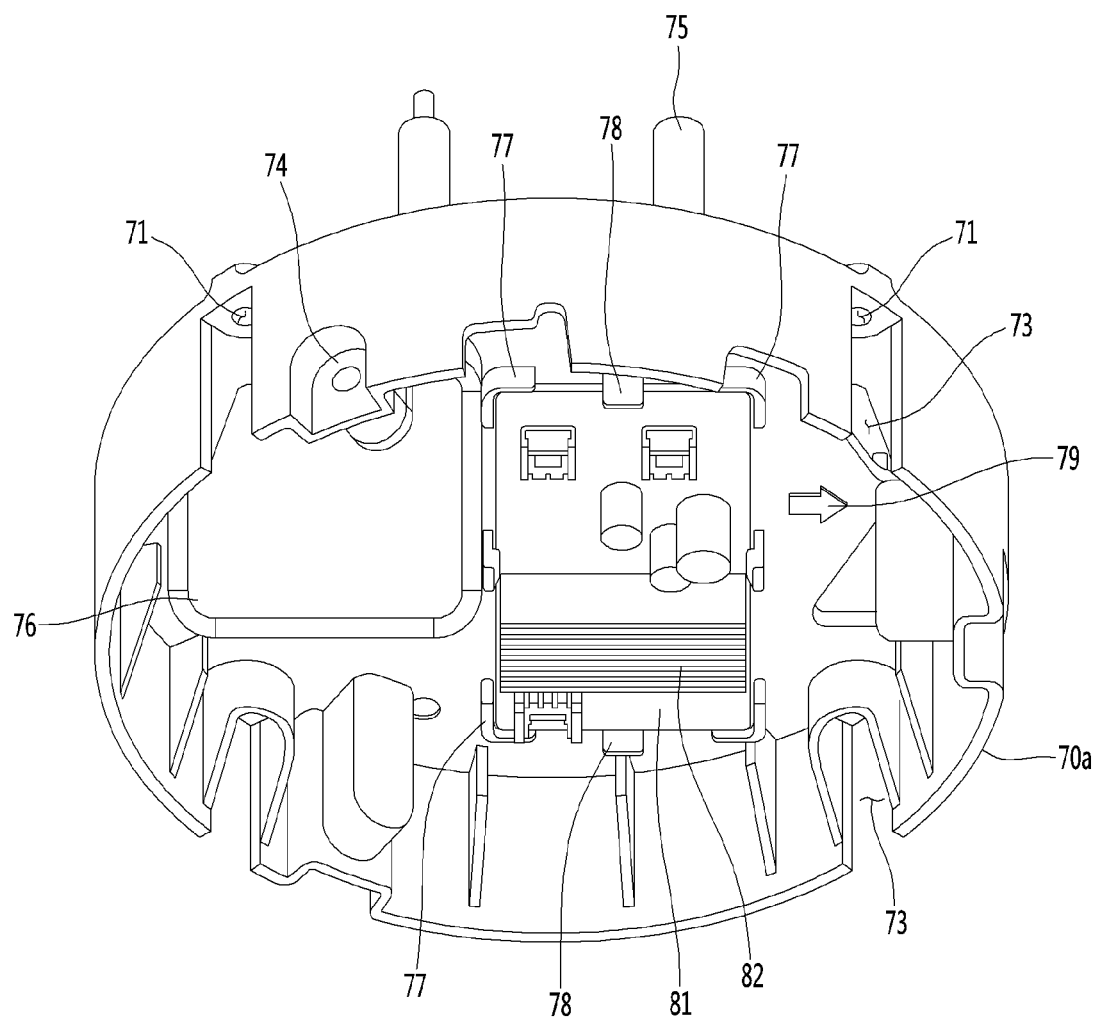
FIG. 12 is a perspective view illustrating components of the bridge case.

FIG. 8 is an exploded perspective view of components received in the housing cover, according to an embodiment of the present disclosure, FIG. 9 is a perspective view illustrating the assembling of the electronic unit according to an embodiment of the present disclosure, FIG. 10 is a perspective view illustrating that some components of FIG. 9 are removed, FIG. 11 is a perspective view that the display cover and the bridge case are coupled to each other according to an embodiment of the present disclosure, and FIG. 12 is a perspective view illustrating components of the bridge case.

Referring to FIGS. 8 to 12, the motor assembly 40 and the bridge support 50 positioned under the motor assembly 40 may be disposed in the internal space 37 of the housing cover 30.

The bridge support 50 may be coupled to and fixed to the lower end of the motor shaft 20. The shaft insertion part 53 may be positioned at the center of the support plate 51. In addition, the shaft insertion part 53 may have a hole into which the motor shaft 20 is inserted.

A plurality of bridges 55 may be provided. In other words, the plurality of bridges 55 may extend perpendicularly and downward along the outer circumference of the support plate 51. Accordingly, the plurality of bridges 55 may form a space, in which the control assembly 60 is positioned, therein. The bridge 55 may be inserted into the bridge hole 71 provided in the bridge case 70.

As described above, the control assembly 60 may include the upper control case 61 and the lower control case 65 assembled together in the vertical direction to seal the internal space.

The upper control case 61 and the lower control case 65 may shield the plurality of electronic components from the outside.

A plurality of holes may be formed in the upper control case 61 and the lower control case 65 to discharge heat emitted from the plurality of electronic components installed in the internal space.

The fixing grooves 62 may be formed corresponding to the number of inner bridges extending upward from the top surface of the bridge case 70.

The inner bridge 75 of the bridge case 70 may be inserted into the hole formed in the fixing groove 62. For example, a coupling member may be coupled to the fixing groove 62, so the control assembly 60 may be coupled to the bridge case 70.

The lower control case 65 may be seated on the top surface of the bridge case 70.

The lower control case 65 may include an inner hole 67 to guide the coupling with the bridge case 70. In addition, a plurality of inner holes 67 may be formed.

The inner holes 67 may be formed by boring positions corresponding to the inner bridge 75. Accordingly, the inner bridge 75 may be inserted and pass through the inner hole 67.

In other words, the inner hole 67 may be formed in a position corresponding to the fixing groove 62 in the vertical direction. In addition, the inner bridge 75 may be positioned to sequentially pass through the inner hole 67 and the fixing groove 62.

The inner hole 67 may allow the inner bridge 75 to be inserted into and pass through the inner hole 67, thereby providing guidance such that the control case 65 is seated at a specified position on the top surface of the bridge case 70.

The lower control case 65 may further include a heat radiation groove 66 recessed downward. For example, the heat radiation groove 66 may be formed to be recessed downward from the bottom inner surface of the upper control case 65.

The heat radiation groove 66 may be formed at a position corresponding to the capacitor 602 which emits a relatively large amount of heat. For example, the heat radiation groove 602, which is a recessed space, and the capacitor 602 is inserted and positioned in the heat radiation groove 602. However, the capacitor 602 may be spaced upwards and positioned such that the capacitor does not make contact with the heat radiation groove 602.

In other words, the heat radiation groove 66 may be formed at a position corresponding to the capacitor 602 in the vertical direction such that the capacitor 602 is disposed above the heat radiation groove 66 while being spaced apart from each other.

The control assembly 60 may further include a main PCB 600 capable of controlling the configurations of the ceiling fan 1.

The main PCB 600 may have a PCB hole through which the inner bridge 75 of the bridge case 70 is inserted and passes.

In addition, the main PCB 600 may be positioned between the upper control case 61 and the lower control case 65. In detail, the main PCB 600 may be supported by the inner bridge 75 passing through the PCB hole to be spaced apart from the upper control case 61 and the lower control case 65 in the vertical direction.

In summary, the inner bridge 75 of the bridge case 70 may sequentially be inserted into and pass through the inner hole 67, the PCB hole, and the fixing groove 62. In addition, the inner bridge 75 may be coupled as the coupling member is inserted into the fixing groove 62.

The inner bridge 75 may stably fix and couple the row control case 65, the main PCB 600, and the upper control case 61.

A plurality of electric components 601, 602, 603, and 604 may be installed in the main PCB 600. The electrical components installed in the main PCB 600 may be mounted on the bottom surface of the main PCB 600.

More specifically, the main PCB 600 may have a driver IC 601 to control the number of revolutions (RPM) of the motor provided in the motor assembly 40, a capacitor 602 to obtain electrostatic capacitance, a power supply unit (SMPS IC) 603 to convert AC power and the DC power into each other, and a transformer 604 to change the values of a voltage or a current.

A driver chip 601, which controls the motor, is mounted on the main PCB 600, so the driver chip 601 may avoid the influence of the motor assembly 40 generating the rotation power due to the electromagnetic action. In other words, since the driver chip 601 may avoid unnecessary electromagnetic interference, it is possible to control the motor more stably.

Third, in the conventional ceiling fan, a driver chip to control the motor is installed in the motor assembly. In other words, to install the driver chip to control the motor, the installation space of an additional PCB has to be ensured inside the motor assembly. Accordingly, the structure of the motor assembly may be complicated in order to prevent various electric wires to connect the PCB with the motor from interfering with the motor to perform the rotation.

In contrast, in the ceiling fan 1 according to the embodiment of the present disclosure, the structure of the motor assembly 40 may be simplified by structurally separating the motor assembly 40 from the control unit, which is to control the motor, that is, the driver chip 601.

In addition, according to the driver chip 601 mounted on the main PCB 600, the motor assembly 40 may be configured in a more compact size, and the rotor may be more stably rotated.

The capacitor 602 is larger in size than other electric components. Accordingly, for the compact construction of the ceiling fan 1, the capacitor 602 may be positioned such that the lower end thereof is inserted into the recessed space formed by the heat radiation groove 606.

In addition, the capacitor 602 may be spaced upward from the heat radiation groove 606. Accordingly, the capacitor 602 may cool the heat and prevent heat from being transferred to the bridge case 70.

The power supply 603 may provide power to the component of the ceiling fan 1, which is required to provide power. The power supply unit 603 may convert and supply the consumed power.

The electric wires connected to the plurality of electric components mounted on the main PCB 600 may be easily connected and arranged by the plurality of harness holes 63 and 73

As described above, the bridge case 70 may include the bridge hole 71, into which the bridge 55 is inserted, the inner bridge 75 to guide the coupling with the control assembly 60, the seating rib 72 to guide the seating of the control assembly 60, the harness hole 73 allowing the wires connecting the plurality of electronic components with each other to pass therethrough, and the insertion groove 74 to guide the coupling with the display cover 90.

The inner bridge 75 may be positioned inside a virtual circle drawn along the plurality of bridge holes 71.

The inner bridge 75 may fix and support the control assembly 60. In addition, the inner bridge 75 may be guided to facilitate the coupling with the control assembly 60.

In detail, the inner bridge 75 may be formed such that the user may easily and intuitively understand the seating direction and the seating position of the lower control case 65 formed in a polygonal shape. For example, a plurality of inner bridges 75 may be provided, and may be formed at irregular positions.

Accordingly, the user may intuitively recognize the direction of rotation of the lower control case 65 such that the plurality of inner holes 67 formed corresponding to the positions of the inner bridge 75 are suitable for the plurality of inner bridges 75 irregularly arranged.

The inner bridge 75 may be formed to protrude upward from the top surface of the bridge case 70. In addition, the inner bridge 75 may have a cylindrical shape.

The inner bridge 75 may be formed at a position corresponding to the inner hole 67. In summary, the inner bridge 75 may sequentially be inserted into and pass through the inner hole 67, the PCB hole, and the fixing groove 62. Accordingly, the inner bridge 75 may stably fix the control assembly 60.

A plurality of bridges 75 may be provided. For example, the number of the inner bridges 75 may be equal to the number of the inner holes 67, the number of the hole 60, and the number of the fixing grooves 62.

In addition, the inner bridge 75 may include a first inner bridge 75a and a second inner bridge 75b having different heights and shapes from each other.

The first inner bridge 75a may be formed in an upper end thereof with a hole for insertion of a coupling member. The first inner bridge 75a may extend to be lower than the second inner bridge 75b.

The first inner bridge 75a may be inserted into or make contact with the fixing groove 62 of the upper control case 61 through the inner hole 67 of the row control case 65 and the PCB hole of the main PCB 600.

The coupling member may be inserted into the hole formed in the upper end of the first inner bridge 75a to couple the lower control case 65, the main PCB 600 and the upper control case 61 together.

The second inner bridge 75b may extend upward from the point having the same height as the upper end of the first inner bridge 75a to have a smaller diameter. The upper end of the second inner bridge 75b may be formed as a curved surface.

The second inner bridge 75a may pass through the inner hole 67 of the lower control case 65, the PCB hole of the main PCB 600, and the fixing groove 62 of the upper control case 61.

In other words, since the second inner bridge 75b may extend with the height sufficient to pass through the fixing groove 62 to fix the control assembly 60, the coupling and the fastening may be easily performed.

The first inner bridge 75a and the second inner bridge 75b may be disposed to cross each other on the top surface of the bridge case 70. The first inner bridge 75a and the second inner bridge 75b may be formed in the same number.

Accordingly, the user may easily and stably insert the lower control case 65, the main PCB 600, and the upper control case 61 by the guide of the second inner bridge 75b.

At the final stage, the coupling member may be inserted into the hole formed in the upper end of the first inner bridge 75a to be coupled In other words, the first inner bridge 75a and the second inner bridge 75b allow the user to easily engage the control assembly 60 and the bridge case 70.

The seating rib 72 may be formed to protrude upward from the top surface of the bridge case 70. A position at which the bottom surface of the control assembly 60 is seated may be defined by the seating rib 72.

A plurality of seating ribs 72 may be provided such that the lateral side of the lower control case 64 is inserted.

The insertion groove 74 may be formed in the lateral side of the bridge case 70. For example, the insertion groove 74 may include a groove recessed inward from a lower end of the lateral side of the bridge case 70. In addition, the insertion groove 74 may include a coupling hole into which the coupling member is inserted and coupled.

The insertion groove 74 may guide the coupling of the display cover 90.

The bridge case 70 may further include a heat radiation groove insertion part 76 corresponding to the heat radiation groove of the lower control case 65.

The heat radiation groove insertion part 76 may be recessed to protrude upward from the top surface of the bridge case 70. For example, the heat radiation groove insertion part 76 may be seated in the heat radiation groove 66.

Therefore, since the top surface of the bridge case 70 and the bottom surface of the lower control case 65 may be engaged together without a difference in height therebetween, the lower control case 65 may stably be seated on the top surface of the bridge case 70.

The bridge case 70 may include one component of the anti-bug module 80.

In detail, the anti-bug PCB 81 of the anti-bug module 80 may be installed on the inner surface of the bridge case 70.

In other words, the anti-bug PCB 81 may be installed on the top surface of the bridge case 70.

Therefore, the bridge case 70 may further include a plurality of fixing guides 77 and a plurality of snaps 78 to guide the engagement of the anti-bug PCB 81.

The plurality of fixing guides 77 may be formed along the side edges of the anti-bug PCB 81.

The fixing guide 77 may be formed to protrude downward from the inner top surface of the bridge case 70 such that the side corners of the anti-bug PCB 81 are fixed. For example, the fixing guide 77 may be formed in the substantially inverse-L shape which is a bending shape. The fixing guides 77 may be provided to support four side corners of the anti-bug PCB 81.

The snap 78 may fix the anti-bug PCB 81 in a press-fitting manner.

The snap 78 may be positioned at intermediate portions of four sides to form side ends of the anti-bug PCB 81.

The snap 78 may be elastically deformed such that the press-fitting manner is possible. In addition, the snap 78 may produce downward from the inner top surface of the bridge case 70. For example, the snap 78 may extend downward from the inner top surface of the bridge case 70. In addition, the snap 78 may have a ring-shaped end to be locked to the anti-bug PCB 81.

A guide sign 78 may be formed on the inner top surface of the bridge case 70.

The guide sign 79 may be formed in an arrow shape. The guide sign 79 functions to guide the coupling direction of the components such as the bridge case 70, the wire, and the anti-bug PCB 81.

The user may easily assemble the bridge case 70 according to the guide sign 79 and may easily mount the component installed in the bridge case 70.

Meanwhile, the anti-bug PCB 81 may have a heat sink 82 for a heat radiation function.

The heat sink 82 may perform a function of cooling the anti-bug PCB 81.

The anti-bug PCB 81 may be connected with a speaker 83 installed on the display cover 90 by an electric wire. In addition, the electric wire may be easily arranged through the harness hole 73 described above.

Figure 13:
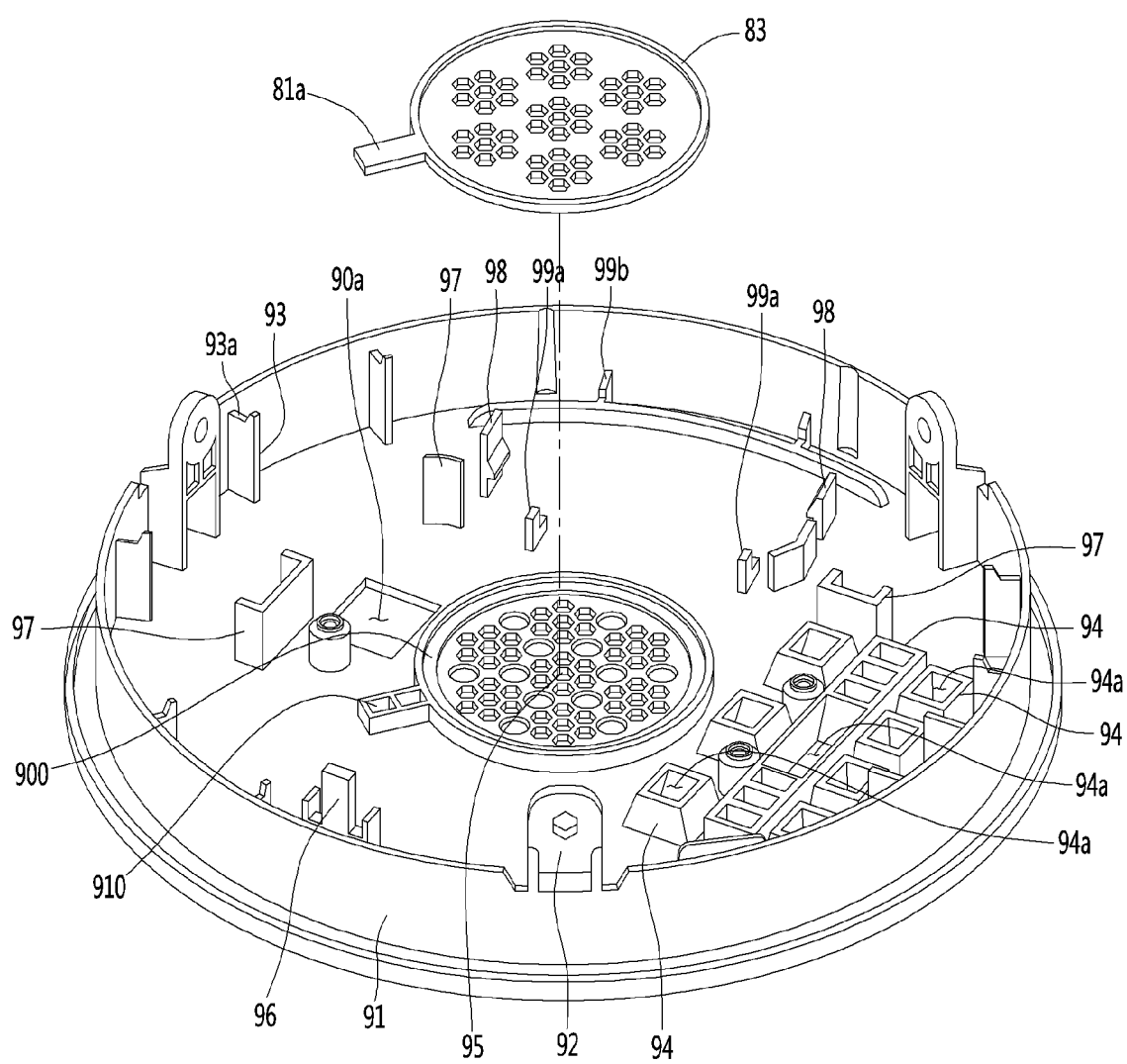
FIG. 13 is a perspective view illustrating the configuration of the display cover according to an embodiment.
Figure 14:
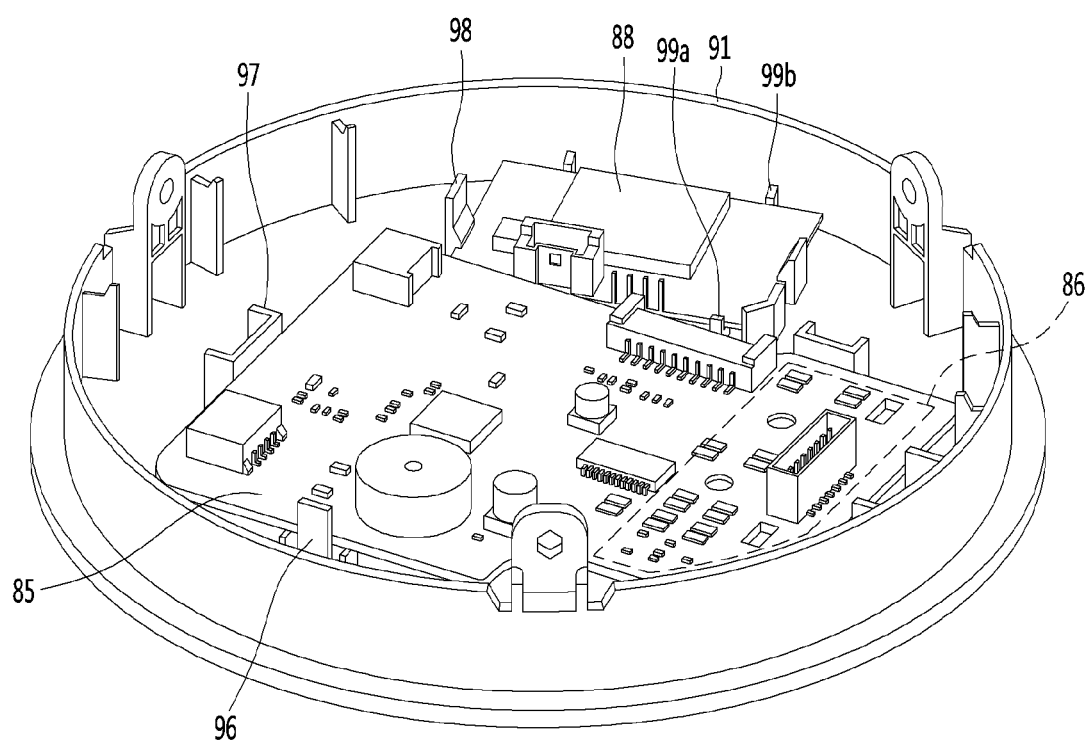
FIG. 14 is a perspective view illustrating that the display module and the communication module are coupled together according to an embodiment of the present disclosure.

FIG. 13 is a perspective view illustrating the configuration of the display cover according to an embodiment, and FIG. 14 is a perspective view illustrating that the display module and the communication module are coupled together according to an embodiment of the present disclosure.

Referring to FIGS. 13 and 14, the display cover 90 may be coupled to the lower portion of the bridge case 70.

In addition, the display cover 90 may include a cover extension part 91 extending perpendicularly upward from the lower end thereof.

The cover extension part 91 may extend along the outer circumference of the display cover 90, that is, in a circumferential direction of the display cover 90. Accordingly, the cover extension part 91 may have an internal space such that a plurality of electronic components are installed in the display cover 90.

The cover extension part 91 may include a coupling guide 92 to guide the coupling to the bridge case 70. In addition, the coupling guide 92 may be formed in the shape corresponding to the shape of the insertion groove 74 such that the coupling guide 92 is inserted into the insertion groove 94.

The display cover 90 may further include a seating guide 98 to seat the bridge case 70.

The seating guide 93 may be formed to protrude inward from the inner circumferential surface of the cover extension part 91. For example, the seating guide 93 may extend toward the center of the display cover 90 from the inner surface of the cover extension part 93.

A plurality of seating guides 93 may be provided. For example, a plurality of the seating guides 93 may be arranged at predetermined intervals in the circumferential direction along the inner circumferential surface of the cover extension par 91.

In other words, the plurality of seating guides 93 may be spaced apart from each other in the circumferential direction.

The seating guide 93 may form a seating groove 93a into which the lower end of the bridge case 70 is inserted.

The seating groove 93a may be formed by cutting the upper end of the seating guide 93 downward. For example, the seating groove 93a may be formed such that a portion of the seating groove 93a, which is in contact with the inner surface of the cover extension part 91, is recessed downward from the upper end of the seating guide 93.

The plurality of seating grooves 93a may be provided in a number corresponding to the number of the seating guides 93. In detail, the lower end of the bridge case 70 may be inserted into the seating grooves 93a formed in the top surfaces of the plurality of seating guides 93.

Accordingly, the bridge case 70 may be stably seated and fixed on the inside of the display cover 90

The display cover 90 may further include a power hole 90a which is an opening formed in a base surface. In this case, the base surface may be defined as an inner circumferential surface of the display cover 90 to support the cover extension part 91. For the convenience of explanation, the base surface may be named the bottom surface of the display cover.

The power hole 90a may guide a light emitted from a light emitting device provided in the display module 85 such that the light is directed to the interior space. For example, the power hole 90a may be positioned in one side of the display cover 90 while being spaced apart from the center of the display cover 90.

The display cover 90 may further include an output hole 95 which is an opening formed in the center of the display cover 90.

The output hole 95 may include a plurality of holes regularly arranged. For example, a plurality of output holes 95 having seven hexagonal shapes may be arranged in the center of the display cover 90 to form a hexagonal shape as a whole. In addition, at least one of seven hexagonal shapes may include seven output holes 95 open in the hexagonal shape.

A partial configuration of the anti-bug module 80 may be seated on the upper side of the output hole 95.

The display cover 90 may further include a speaker coupling part 900 to guide the coupling of the speaker 83.

The speaker coupling part 900 may be positioned at a center of the base surface of the display cover 90 so as to have a predetermined radius. For example, the speaker coupling part 900 may be provided in the form of a circular rib protruding upward from the base surface of the display cover 90.

The speaker coupling part 900 may have a stepped surface formed in the circumferential direction. The speaker 83 may be seated on the stepped surface.

The speaker coupling part 900 may have a fitting groove 910 which is engaged with the speaker 83.

The fitting groove 910 may be formed to be engaged with the fitting part 83a of the speaker 83. For example, the fitting groove 910 may be formed such that the fitting part 83a is introduced or inserted. In addition, the fitting part 83a of the speaker 83 may be coupled to the fitting groove 910 in a press-fitting manner.

Meanwhile, the speaker coupling part 900 may be integrally formed with the output hole 95 defined as a group of a plurality of perforated holes toward the center.

The speaker 83 may have a plurality of holes corresponding to the output holes 95 in the vertical direction.

The speaker 83 converts an electrical signal received from the anti-bug module 81 into an acoustic signal, thereby discharging the ultrasound to the interior space through the output hole 95.

Accordingly, an ultrasound may be emitted to stimulus of the nerve of the pests, so the access of the pests to a peripheral portion of the ceiling fan 1 may be prevented.

Accordingly, the pests avoiding the ultrasounds may be prevented from accessing to the ceiling fan 1, so that the management of the ceiling fan 1 is improved.

The speaker 83 may have a fitting part 83a formed to protrude in the radial direction from the outer end portion.

The fitting part 83a may be inserted into the fitting groove 96a when the speaker 83 is seated on a speaker coupling part 96. Therefore, the fitting part 83a and the fitting groove 96a may be formed in the shape for mutual engagement therebetween.

Meanwhile, the anti-bug PCB 81 is mounted in the bridge case 70 and the speaker 83 is mounted in a speaker coupling part 900 formed at the center of the display cover 90, Accordingly, the ceiling fan 1 having a plurality of electric components may be made in more compact size.

Meanwhile, as described above, the speaker 83 which output the ultrasounds and the speaker coupling part 900 may be positioned at the center of the display cover 90. In other words, the center of the display cover 90 may be positioned on the line of the central axis of the ceiling fan 1.

An air flow stagnant region in which air flow is relatively slower than another interior space may be formed vertically under the display cover 90.

The ultrasound output from the anti-bug module 80 may be influenced by the air flow.

For example, when the speaker 83 is provided at another position instead of the center of the lower end of the ceiling fan 1, the ultrasound output from the speaker 83 may be more greatly affected by the air flow generated by the rotation of the blades 100 and 200.

In other words, the ultrasounds may not uniformly spread to the surrounding area of the ceiling fan 1 due to the pressure difference of air, the flow rate of air, the direction of the air flow, and the like.

Therefore, in order to effectively eliminate the pests by the ultrasound output from the anti-bug module 80, it is preferred that the ultrasound is output to the area where the air flow fluctuation is relatively low.

As a result, the position where the speaker 93 is installed. That is, the optimal position of the output hole 95, from which the ultrasound is output, may be the center of the display cover 90 forming the center of the lower end of the ceiling fan 1. Accordingly, since the output ultrasound are relatively less influenced by the air flow, it is possible to more effectively prevent access of pests around the ceiling fan 1.

The display module 85 may be positioned above the speaker 83 mounted in the speaker coupling part 900.

The display cover 90 may further include a display module coupling device 96 and a display module guide 97 to guide the coupling of the display module 85.

A plurality of the display module guides 97 may be disposed to be appropriate to the size of the display module 85. The display module guide 97 may extend vertically upward from the base surface of the display cover 90.

The display module guide 97 may be formed such that corner portions of the display module 85 are fixed to be in contact with the display module guide 97. For example, the display module guide 97 may extend perpendicularly upward from the base surface of the display cover 90 to support the upper and side ends of the display module 85.

The display module coupling device 96 may be formed of a material allowing elastic deformation. For example, the display module coupling device 96 may be formed to extend upward in a hook shape.

The display module coupling device 96 may be elastically deformed outward when the display module 85 is introduced downward along the display module guide 97.

When the display module 85 is seated in the seating position and the introduction is completed, the display module coupling device 96 may be elastically restored to press and fix the display module 85.

Meanwhile, the display module 85 may include a light emitting diode mounting part 86.

The light emitting diode mounting part 86 may be understood as a region in which some of a plurality of light emitting devices installed in the display module 85 is installed. For example, the light emitting diode mounting part 86 may have light emitting diodes (LED) corresponding to a plurality of light guides 94, respectively.

In addition, the light emitting diode mounting part 86 may be arranged to be supported by the top surfaces of the plurality of light guides 94.

The display cover 90 may further include a plurality of light guides 94 to guide light provided from a plurality of light emitting devices installed in the display module 85.

The plurality of light guides 94 may be positioned in an inner space defined by the plurality of display module guides 97. For example, the light guide 94 may be formed at a position that is symmetrical to the formation position of the power hole 90*a* with respect to the center of the display cover 90.

The light guide 94 may extend upward from the base surface (or the bottom surface) of the display cover 90 to form a hole having a rectangular cross section. For example, the light guide 94 may be formed in a vertically open hexahedral shape.

In other words, the light guide 94 may form the light hole 94*a* in the vertical direction.

In addition, the light guide 94 may extend from the base surface of the display cover 90 such that the sectional area of the light guide 94 is reduced upward from the base surface. For example, the light guide 94 may be formed in a shape of a truncated quadrangular pyramid.

The light guide 94 may be positioned vertically downward to correspond to the light emitting device installed in the display module 85.

In other words, the light emitting device may be mounted on the display module 85 such that the light emitting device corresponds to an upper portion of the light hole 94*a*. Therefore, lights provided from each of the plurality of light emitting devices may be directed to the interior space along the respective light guides 94 such that the lights are prevented from interfering with or influenced by each other.

Accordingly, lights having different intensities and colors, which are provided from a plurality of light emitting devices, may be provided toward the interior space without being mixed with each other by the light guide 94. Therefore, the ceiling fan 1 has an advantage that it may provide clear visual information according to functions.

The plurality of light guides 94 may be formed in different shapes. For example, some of the plurality of light guides 94 may extend to have a rectangular section of a wider area, and may be arranged to have a longer spacing from each other in one direction. For example, others of the plurality of light guides 94 may extend to have a rectangular section of a narrower area, and may be arranged to have a smaller spacing from each other in one direction.

Accordingly, the plurality of light guides 94 may guide lights having various intensities or colors.

Meanwhile, the light emitting device may be installed by a separate module different from the display module 85. For example, the display cover 90 may have another light emitting diode (LED) to correspond to an outer opening 801 (see FIG. 16) formed in a circle along the outer circumference of the bottom surface of the display cover 90.

The display cover 90 may further include a communication module guide 99*a* to guide the coupling of the communication module 88, a communication module locking part 99*b*, and a communication module coupling device 98.

The communication module 88 may be installed at a position lower than the display module 85.

The communication module guide 99*a* may be formed in one side space of the display cover 90 to avoid interference between the display module 85 and the communication module 88.

In addition, communication module guides 99*a* may be provided in one pair. For example, the communication module guides 99*a* may extend upward from positions spaced apart from each other on the base surface of the display cover 90 while forming one pair.

The communication module guide 99*a* may have an upper end which is bent such that the side end of the communication module 88 is seated. The communication module guide 99*a* may be formed in an 'L' shape. Therefore, the communication module 88 may be seated in the pair of communication module guides 99*a*.

The communication module guide 99*a* may fix one end of the communication module 88. The communication module locking part 99*b* may fix the other end of the communication module 88.

The communication module locking part 99*b* may be formed to protrude upward from the base surface of the display cover and may extend by a predetermined length in the circumferential direction.

A pair of locking protrusions may be formed at the upper ends of the communication module locking part 99*b* to press the communication module 88 from above.

Therefore, the communication module 88 may have one side portion seated in the communication module guide 99*a* and an opposite side seated and inserted into the communication module locking part 99*b*

In this case, the communication module coupling device 98 may couple the communication module 88. In detail, a pair of communication module coupling devices 98 may be provided in a pair to fix an upper end and a lower end of the communication module 88, respectively.

Also, the communication module coupling device 98 may extend upward from the base surface of the display cover 90 to have a hook shape. The display module coupling device 98 may be formed of a material allowing elastic deformation. Therefore, when the communication module 88 is introduced such that the communication module 88 is mounted in the communication module guide 99*a* and the communication module locking part 99*b*, the communication module coupling device 98 is elastically deformed to guide the communication module 88 such that the communication module 88 may be seated, and then may be recovered to fix and couple the communication module 88.

Since a plurality of electric components are provided in the inner space formed by the control assembly 60, the bridge case 90, and the display cover 90, there may occur a problem in relation to satisfying the standard of an electromagnetic interference (EMI), or an electrostatic discharge (ESD)

However, according to an embodiment of the present disclosure, the bridge case 70 and the display cover 90 of the ceiling fan 1 may be provided to shield one-stage electronic unit having a plurality of electric components (modules) which are installed therein, In addition, the upper control case 61 and the lower control case 65 may be provided to shield the two-stage electronic unit, in which a plurality of electronic components (modules) are installed, from the outside.

Accordingly, the ceiling fan 1, in which a plurality of electrical components are installed, may stably satisfy standards of the EMI and the ESD and may easily cope with problems to be caused by a plurality of electronic components.

In addition, it is possible to prevent electrical disturbance from unnecessary signals generated from the plurality of electric components In other words, the upper control case 61, the lower control case 65, the bridge case 70, and the display cover 90 may prevent unnecessary electromagnetic signals or electromagnetic noise generated from the plurality of electronic components installed in the internal space from causing the failure in signal reception of electronic components installed at a different position.

Figure 15:
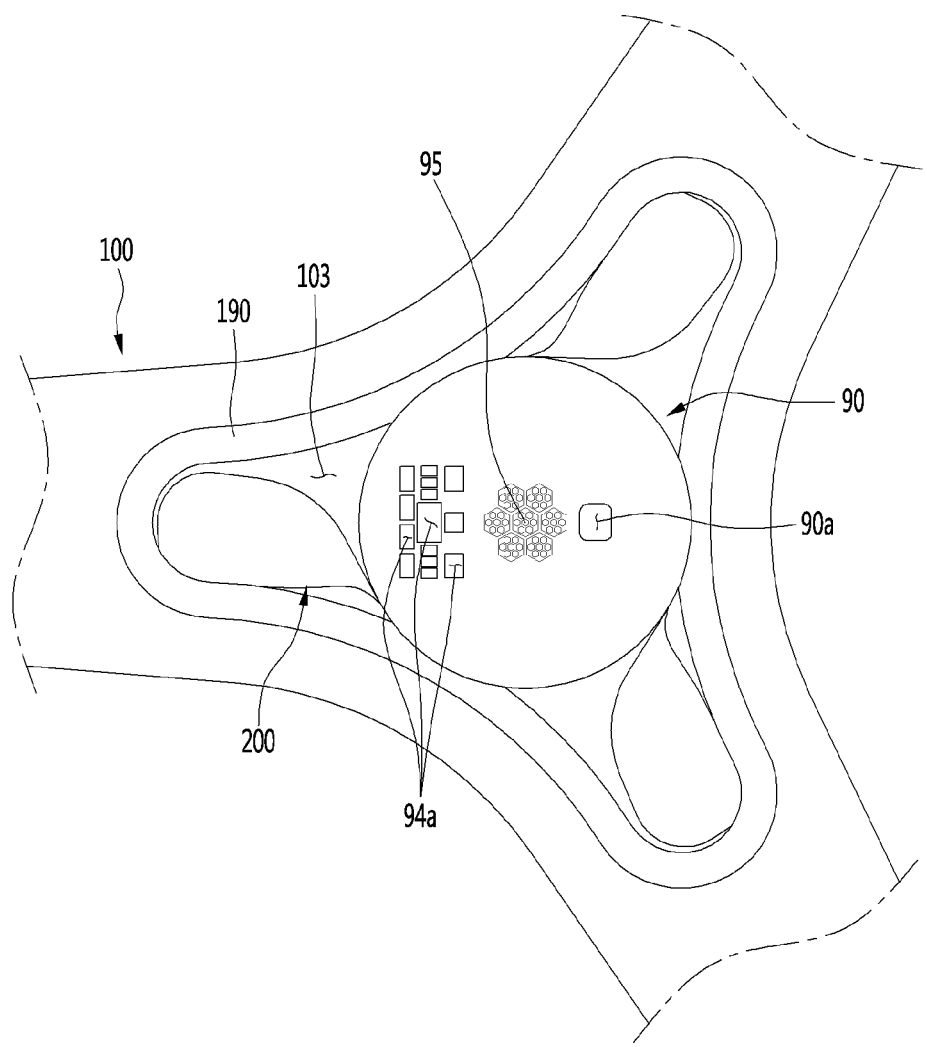
FIG. 15 is an enlarged view of the ceiling fan viewed from the bottom according to an embodiment of the present disclosure.

FIG. 15 is an enlarged view of the ceiling fan viewed from the bottom according to an embodiment of the present disclosure.

Referring to FIG. 15, the output hole 95 may be positioned in the bottom surface of the display cover 90.

The power hole 90a may be positioned in one side of the output hole 95, on the bottom surface of the display cover 90. A plurality of light holes 94a may be positioned in another side of the output hole 95, on the bottom surface of the display cover 90.

The power hole 90a may be formed in a rectangular shape having rounded corners.

The plurality of light holes 94a may be provided in the form of rectangular holes. In addition, the plurality of light holes 94a may have openings with different areas.

In addition, the plurality of light holes 94a may be formed at different positions according to functions. In detail, the plurality of light holes 94a may be formed in a plurality of rows and columns.

For example, a first group of light holes 94a, which are formed at the outer most part, of the plurality of light holes 94a may visually display the rotation direction or the rotation strength. The first group of light holes 94a may have the same opening areas.

In addition, a second group of light holes 94a formed at an inner side than the first group of light holes 94a may visually display whether a timer is turned on/off or a timer setting function. The second group of light holes 94a may have mutually different opening areas depending on relevant functions thereof.

In addition, a third group of light holes 94a formed at the inner part than the second group of light holes 94a may visually display an on/off state of various convenience functions. The third group of light holes 94a may have the same opening areas.

An escutcheon (not illustrated) may be mounted under the display cover 90 to transmit a light.

The escutcheon may have a pattern corresponding to the power hole 90a and a plurality of light holes 94a under the power hole 90a and the light holes 94a.

In other words, the escutcheon may have a pattern indicating the function of the ceiling fan, which is formed at a position corresponding to the light emitting device and the light guide in the vertical direction.

The escutcheon may include a metal or coating material.

The escutcheon may have various patterns formed therein. The pattern may transmit a light provided from the light emitting device provided in the display module 95. Therefore, the pattern may be visually more clearly viewed to the user.

In the escutcheon, a portion where the pattern is formed may be formed of a material that transmits a light, and the portion where the pattern is not formed may be formed of an opaque material.

Hereinafter, a light emitting scenario capable of visually informing the user of various functions of the ceiling fan 1 by mounting the escutcheon will be described in detail.

Figure 16:
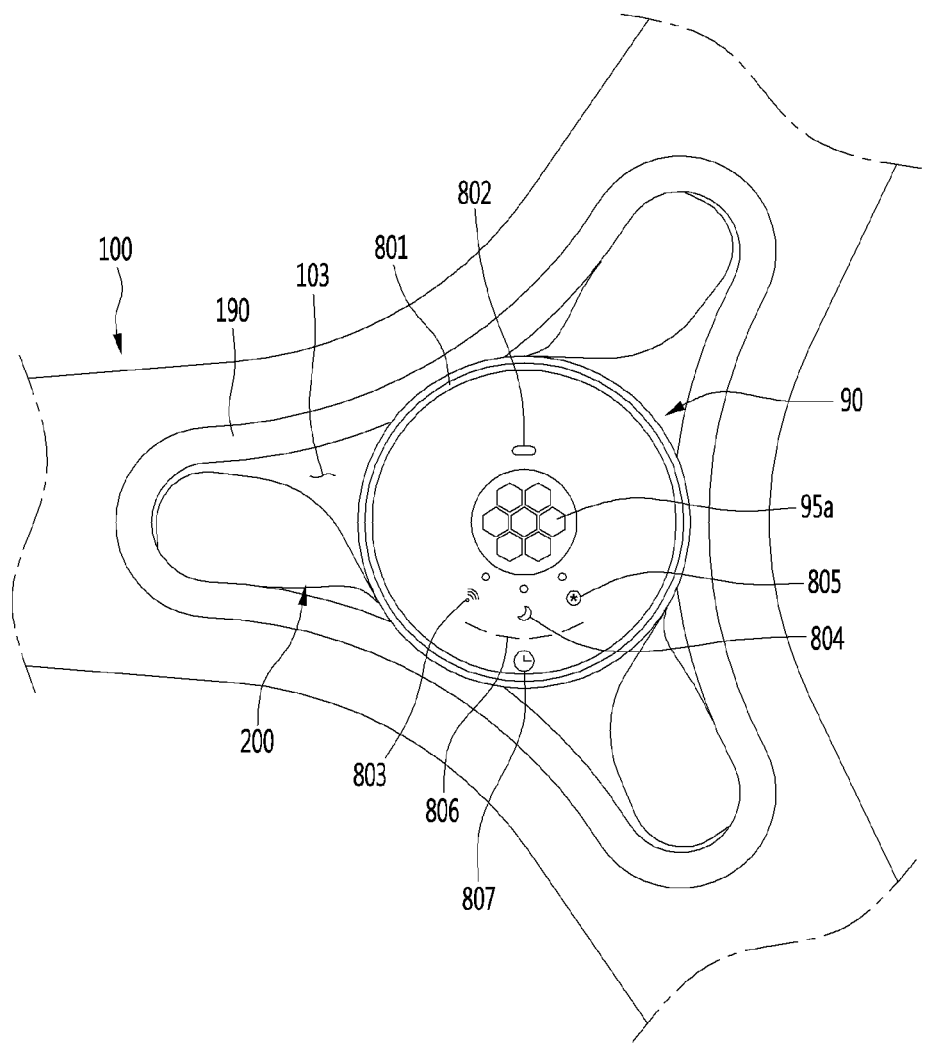
FIG. 16 is a view illustrating a light emitting portion of the ceiling fan according to an embodiment of the present disclosure.

FIG. 16 is a view illustrating a light emitting portion of the ceiling fan according to an embodiment of the present disclosure.

Referring to FIG. 16, the escutcheon may be installed under the display cover 90.

The ceiling fan 1 may transmit a light provided from light emitting diodes (LEDs) arranged corresponding to the plurality of light holes 94 by the escutcheon to provide a visual mark to the user.

In detail, a light emitting diode (LED) is disposed in an outer opening 801 formed along the outer circumference of the bottom surface of the display cover 90 to visually provide information on the rotating direction of the ceiling fan 1 to the user.

For example, the outer openings 801 may be divided into four zones in the circumferential direction. When the blades 100 and 200 of the ceiling fan 1 rotate in the forward direction (clockwise direction), the four zones of the outer opening 801 may emit light at time intervals in the clockwise direction while starting from any one zone. Accordingly, the user may determine whether the rotation of the ceiling fan 1 is in the forward direction or the backward direction through the movement of light provided from the outer opening 801.

In addition, the ceiling fan 1 may be provided with the escutcheon described above so that light irradiated to the power hole 90a is transmitted. Accordingly, the light generated from the light emitting diode (LED) provided corresponding to the power hole 90a may be irradiated to the interior space to provide visual information of the power state.

In addition, the ceiling fan 1 may provide the connection state of the communication module 88 in the form of visual information through the escutcheon engraved with the signal pattern 803. In other words, the light emitted from the light hole 94 formed above the signal pattern 803 may pass through the signal pattern 803. Accordingly, the user may determine the connection state of the communication module 88 through the light of the signal pattern 803.

In the same manner, the ceiling fan 1 may provide, in the form of the visual information through the escutcheon engraved with the moon-shaped pattern 804, the state of the sleep mode operation in which the power saving operation is performed at night.

In addition, the ceiling fan 1 may provide the operating state of the anti-bug module 80 in the form of the visual information through the escutcheon engraved with a worm-like pattern 805. In addition, the operating state of the anti-bug module 80 may be visually expressed by the light provided from the light emitting diode installed along the outline line of the output hole 95.

In addition, the ceiling fan 1 may provide the on or off state of the timer in the form of the visual information through the escutcheon engraved with a clock pattern.

In addition, the ceiling fan 1 may provide the steps of the timer in the form of the visual information through the escutcheon engraved with a plurality of rectangular patterns 806. In this case, the steps of the timer may be understood as the set operating time.

Figure 17:
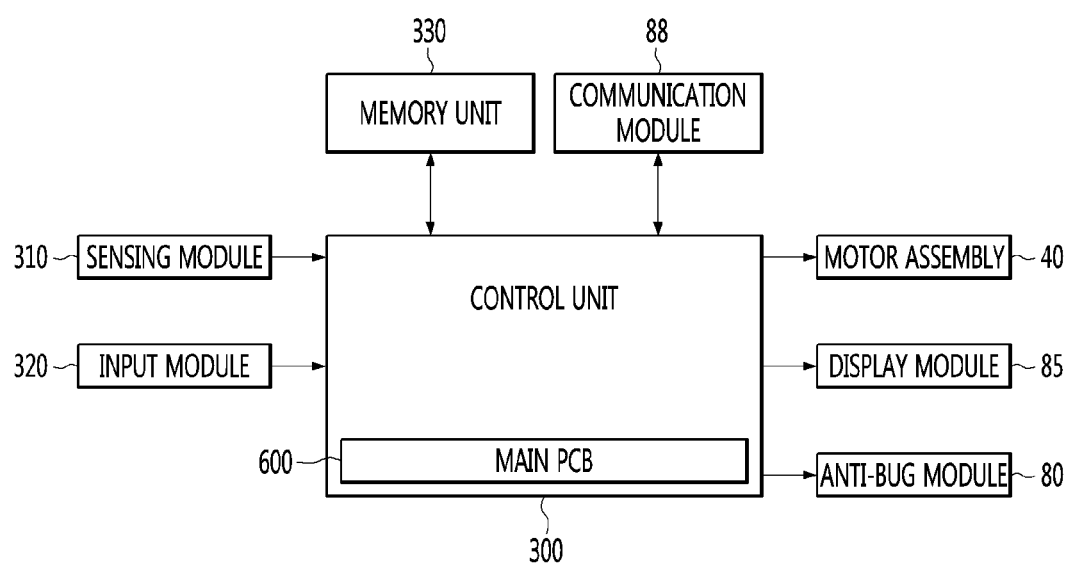
FIG. 17 is a block diagram illustrating the configuration of the ceiling fan according to an embodiment of the present disclosure.

FIG. 17 is a block diagram illustrating the components of the ceiling fan 1 according to an embodiment of the present disclosure.

Referring to FIG. 17, the ceiling fan 1 may further include a control unit 300 to control components.

In addition, the control unit 300 may be provided in the electronic unit. For example, the control unit 300 may include the main PCB 600 described above.

The control unit 300 may process data transmitted/received by the communication module 88. For example, the control unit 300 may receive and process information, such as a user setting temperature, a real-time indoor temperature, or a real-time sensed dust quantity from another interworking air conditioning product through the communication module 88. In addition, the control unit 300 may inversely provide the above information to another air conditioning product through the communication module 88.

The control unit 300 may perform a control operation in connection with the motor assembly 40 to control the RPM of the motor.

In addition, the control unit 300 may perform a control operation in connection with the display module 85 to control the lightening brightness or color.

In addition, the control unit 300 may perform a control operation in connection with the anti-bug module 80 to generate an ultrasound for avoiding the pests and to discharge the ultrasound out of the ceiling fan 1.

The ceiling fan 1 may further include a memory unit 330 to store data, a sensing module 310 to sense the environment of the interior space, and an input module 320 to receive a manipulation command from a user.

The control unit 300 may read data stored in the memory unit 330 and may store the processed information in the memory unit 330.

The sensing module 310 may include a temperature sensor to sense the indoor temperature, the dust sensor to sense an indoor dust quantity, and a humidity sensor to sense interior humidity.

In addition, the control unit 300 may receive and process information sensed by the sensing module 310. For example, the control unit 300 may receive the information on the indoor temperature by the sensing module 310 to determine the difference from the user setting temperature, may manipulate the motor assembly 40, and may vary the RPM of the motor.

The control unit 300 may process the user input received through the input module 320. For example, the controller 300 may receive and process the time settings, the temperature settings, or air volume settings of the ceiling fan 1 received from the input module 320.

Figure 18:
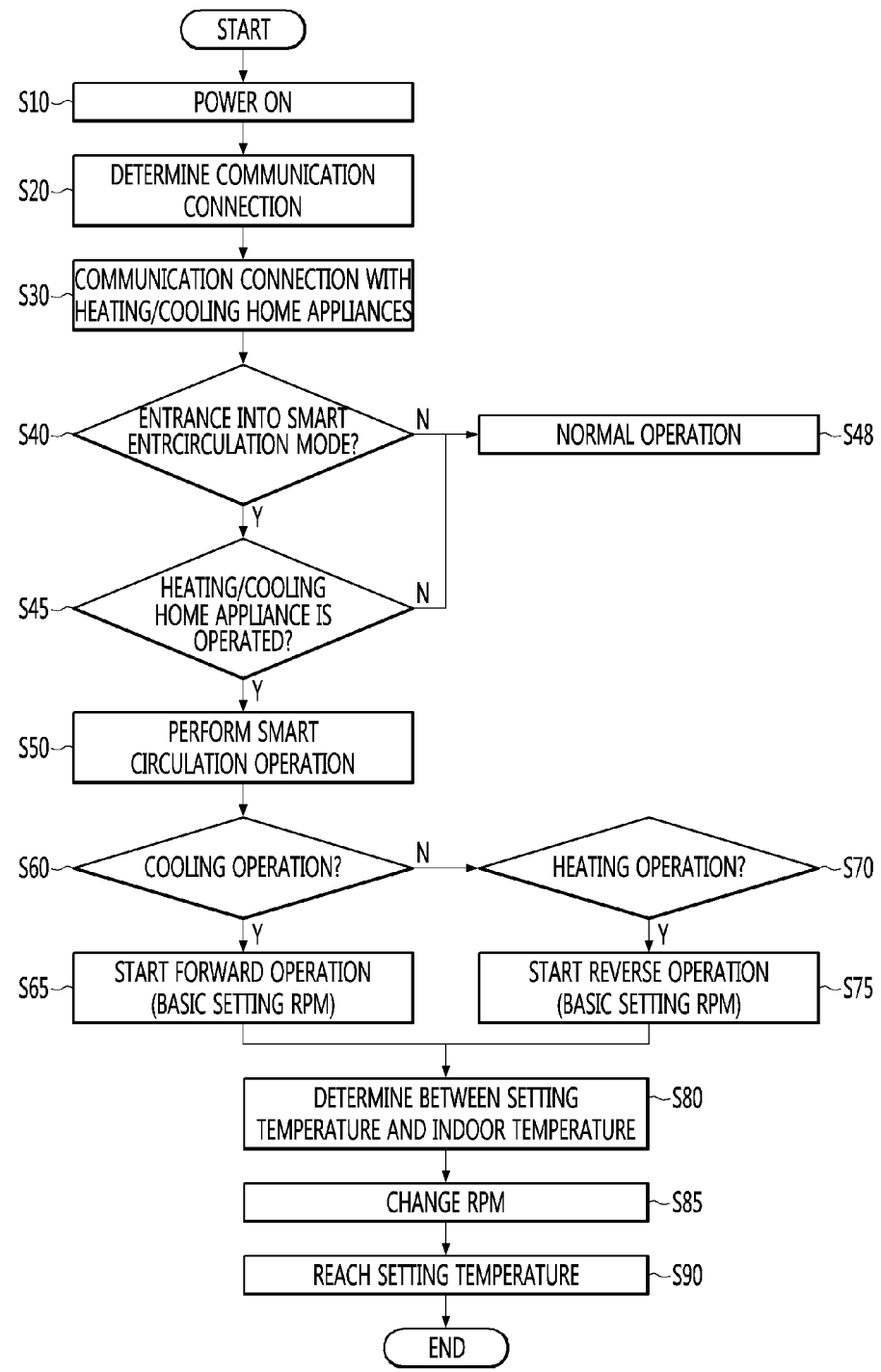
FIG. 18 is a flowchart illustrating a method for controlling the ceiling fan according to an embodiment of the present disclosure.

FIG. 18 is a flowchart illustrating a method for controlling the ceiling fan according to an embodiment of the present disclosure.

Referring to FIG. 18, the ceiling fan 1 may operate by interworking with a plurality of air conditioning products installed in the interior space.

First, the ceiling fan 1 may be powered on depending on the input signal of the user. In other words, the ceiling fan 1 may be powered on (S10).

In addition, the ceiling fan 1 may determine the connection state of the communication module 88 (S20). For example, the control unit 300 may perform a control operation to reset the communication module 88 and to correctly operate the communication module 88 according to a control command.

In addition, the ceiling fan 1 may perform a communication connection with a plurality of air conditioning products installed in the interior space (S30).

In this case, the plurality of air conditioning products may include a heating/cooling home appliance having a communication device connected with the communication module 88. For example, the heating/cooling home appliance may include a heater, a fan, and an air conditioner.

The ceiling fan 1 may be synchronized with another air conditioning product through the communication connection. For example, the ceiling fan 1 may perform the communication connection with another air conditioning product, which is first operating, to receive the control sequence of the connected air conditioning product.

In addition, the ceiling fan 1 may determine whether to enter a smart circulation mode (S40).

In detail, when the communication connection with a plurality of air conditioning products is accomplished, the control unit 300 may determine whether to enter the smart circulation mode, depending on the input signal of a user or the set input state. For example, when the user inputs the smart mode using the input device, the control unit 300 may determine that the entrance into the smart circulation mode is allowed.

To the contrast, the control unit 300 may perform a control operation allowing the ceiling fan 1 to enter into a normal mode, when the entrance into the smart circulation mode is not allowed (S48).

The smart circulation mode may be defined as a mode to recognize the mutual operating state with the air conditioning product interworking or synchronized through the communication module 88 and to manage the whole air state of the interior space.

When the ceiling fan 1 enters into the smart circulation mode, the ceiling fan 1 may determine the operating states of the plurality of air conditioning products interworking with the ceiling fan 1 (S45).

In detail, the control unit 300 may receive the information on the operating state of the interworking air conditioning product (cooling/heating home appliance) to determine the operation of the ceiling fan 1. For example, the control unit 300 can determine the household appliance whose power is turned off among the interlocked air-conditioning products (air-conditioning home appliance).

In this case, the control unit 300 may perform a control operation to perform the normal operation when all the interworking air conditioning products are powered off (S48)

In addition, when some of the interworking air conditioning products is powered off, the control unit 300 may perform a control operation to integrally operate with remaining product except for the powered-off state product.

In addition, the ceiling fan 1 may receive the indoor environment information sensed by the interworking air conditioning product.

For example, the control unit 300 may receive an indoor temperature sensed by the air conditioner mounted on the wall surface of the room, and may receive an indoor dust quantity and comfort information from the air purifier installed on the ground surface.

In this case, the control unit 300 may compare the information of the sensing module 310 installed in the vicinity of the ceiling to determine the red zone of the interior space.

In addition, the control unit 300 may change the operation setting of the ceiling fan 1 and a plurality of air conditioning products interworking with the ceiling fan 1 to enhance the circulation of air flow in a position determined as the red zone, while performing the operation based on the smart circulation mode.

In addition, when user setting values of the interworking air conditioning products are different from each other, the ceiling fan 1 make the user setting values identical to user setting information input to the ceiling fan 1 to integrally perform a control operation.

In addition, the ceiling fan 1 may perform an operation based on the smart circulation mode (S50).

In the operation based on the smart circulation mode, the heating or cooling operation of the ceiling fan 1 may be determined to determine the rotation directions of the blades 100 and 200 corresponding to the relevant operations (S60 and S70).

For example, when the operation in the smart circulation mode is executed, the ceiling fan 1 may receive the operating mode of the interworking air conditioning product.

In addition, when the interworking air conditioning product performs the cooling operation, the ceiling fan 1 determines a mode as a cooling mode (S60). When the interworking air conditioning product performs the heating operation, the ceiling fan 1 determines the mode as a heating mode (S70).

When the ceiling fan 1 determines the mode as the cooling mode (operation), the ceiling fan 1 may control the blades 100 and 200 to perform forward rotation. The forward rotation may be defined as rotation that the blades 100 and 200 rotate in a clockwise direction. The forward rotation of the ceiling fan 1 may maximize the cooling effect of the cooling operation (S65).

For example, when the interworking air conditioning product performs the cooling mode (operation), the control unit 300 may recognize that it is necessary to provide cooling to the interior space, and may control the motor assembly 40 to perform the forward operation based on a preset basic RPM.

When the ceiling fan 1 determines the mode as the heating mode (operation), the ceiling fan 1 may control the blades 100 and 200 to perform a reverse rotation. The reverse rotation may be defined as rotation that the blades 100 and 200 rotate in a counterclockwise direction. The reverse rotation of the ceiling fan 1 may maximize the cooling effect of the cooling operation (S75).

For example, when the interworking air conditioning product performs the heating mode (operation), the control unit 300 may recognize that it is necessary to provide heating to the interior space, and may control the motor assembly 40 to perform the reverse operation based on a preset basic RPM.

In other words, the operation of the ceiling fan 1 may be performed such that the ceiling fan 1 follows the operating modes of the plurality of air conditioning products.

In addition, the ceiling fan 1 may determine the difference between the user setting information and the sensed interior information (S80).

In more detail, the control unit 300 may determine the differential value between the indoor temperature and the user setting temperature with respect to each section of the interior space by combining the sensing information of the sensing module 310 of the ceiling fan 1 and the sensing information of the plurality of interworking air conditioning products.

For example, the control unit 300 may determine the sensing information of the sensing module 310 as the air state of the interior ceiling space, and may determine the sensing information received from an air purifier installed on the ground surface as the air state of an interior space close to the ground surface. In addition, the control unit 300 may determine the sensing information received the air conditioner mounted on the interior sidewall as the air state of the interior side space.

In addition, the control unit 300 may calculate the difference between the user setting value and the sensing value with respect to each section of the interior space and may store the calculated value.

The ceiling fan 1 may control the supplementing operation with a plurality of interworking air conditioning products using the storage information for each section of the interior space. In other words, the ceiling fan 1 may change the motor RPM according to the difference between the user setting temperature and the indoor temperature (S85)

For example, when the cooling operation is performed and when the differential value between the user setting temperature and the indoor temperature is great, the ceiling fan 1 may increase the RPM to perform a control operation such that the indoor air circulation speeds up.

In addition, when the difference between the user setting value and the sensing value is great in a specific section of the interior space, the ceiling fan 1 may control the air conditioning product closest to the relevant section to enhance the cooking or heating strength, and may increase the RPM of the ceiling fan 1 to maximize the cooling effect.

Thereafter, the ceiling fan 1 may determine whether the sensing value in the interior space satisfies the user setting value (S90)

For example, the ceiling fan 1 may determine whether the indoor temperature satisfies the user setting temperature.

In addition, the ceiling fan 1 may terminate the smart circulation mode when the sensing value in the interior space satisfies the user setting value.

Figure 19:
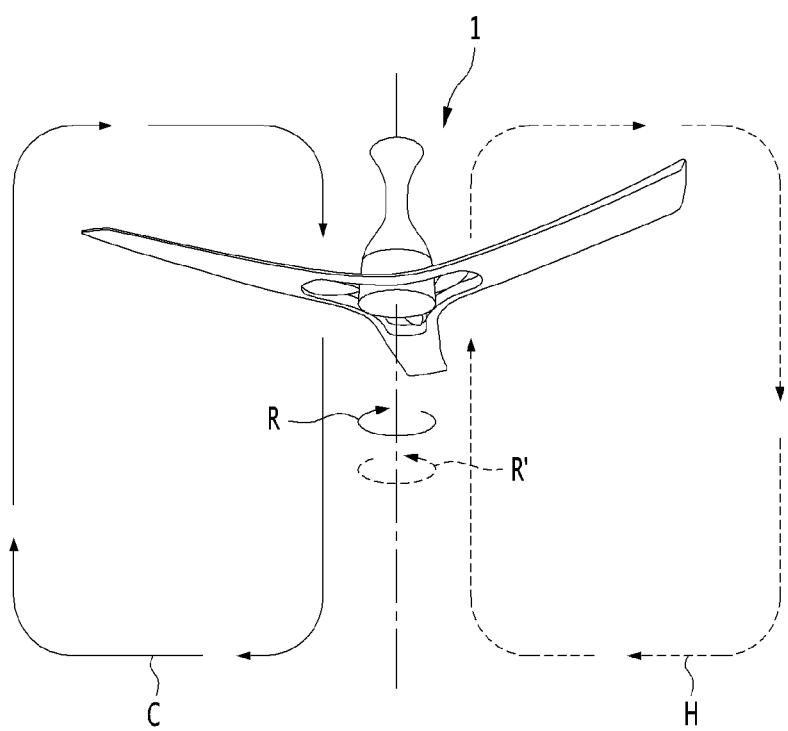
FIG. 19 is a view illustrating the rotation direction and the airflow direction based on the cooling mode or heating mode of the ceiling fan according to an embodiment of the present disclosure.

FIG. 19 is a view illustrating the rotation direction and the air flow direction based on the cooling mode or heating mode of the ceiling fan 1 according to an embodiment of the present disclosure.

When the ceiling fan 1 determines that the cooling is required in the interior space, the ceiling fan 1 performs the forward rotation R, and when the ceiling fan 1 determines that the heating is required, the ceiling fan 1 performs the reverse rotation R'. Accordingly, the cooking or heating effect may be maximized.

Referring to FIG. 19, when the ceiling fan 1 performs the forward rotation in the clockwise direction R, the direction of the air flow may an upward flow toward the ceiling fan 1 and may be a downward flow away from the ceiling fan 1.

In other words, when the ceiling fan 1 performs the forward rotation, the air near the ceiling fan 1 is pushed down by the blades 100 and 200, and the air near the indoor sidewall, which relatively moves away from the ceiling fan 1, rises by the flow of air introduced from the lower portion of the indoor to form the negative pressure.

Accordingly, when a cooling mode is performed, and the ceiling fan 1 performs the forward rotation, the hot air in the lower portion of the indoor may be circulated to the outside so that the cooling effect is maximized.

Meanwhile, when a heating mode is performed, since the indoor temperature is substantially lowered, the warm air discharged through the air conditioning product may naturally form an uprising air flow due to the temperature difference.

Accordingly, the ceiling fan 1 may perform the reverse rotation R' in the heating mode. According to the reverse rotation R', the air flow is forced so that the air in the vicinity of the ceiling fan 1 rises upward by the rotation of the blades 100 and 200. Accordingly, a downward air flow H may be formed on the indoor sidewall.

Accordingly, the ceiling fan 1 may prevent the warm air, which is discharged from another air conditioning product from being concentrated in the vicinity of the ceiling due to the cold indoor temperature and may forcibly circulate the air in the vicinity of the ceiling to the lower portion of the interior space. Accordingly, the heating effect may be maximized.

Figure 20:
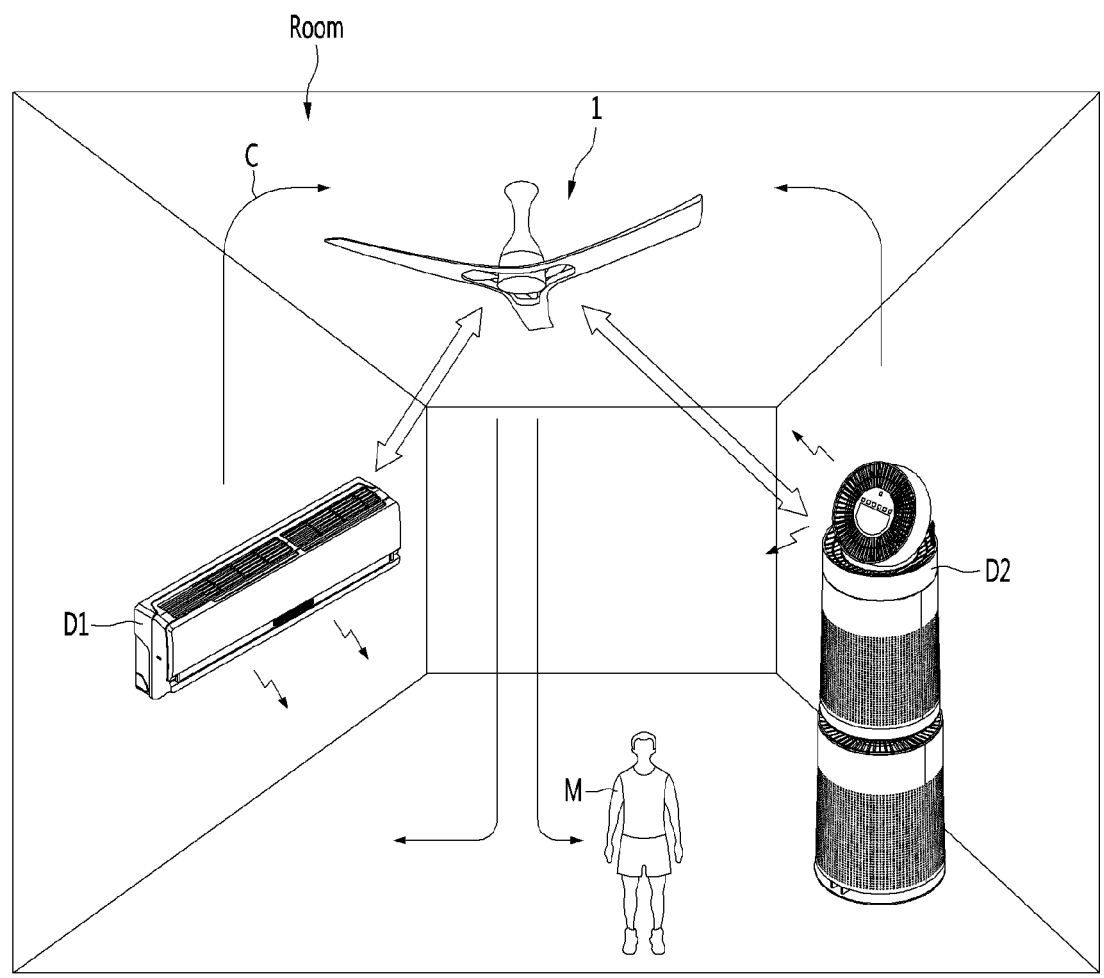
FIG. 20 is a schematic view illustrating the integral management of the indoor air as the ceiling fan interworks with a plurality of air conditioning product according to an embodiment of the present disclosure.

FIG. 20 is a schematic view illustrating the integral management of the indoor air as the ceiling fan interworks with a plurality of air conditioning product according to an embodiment of the present disclosure.

Referring to FIG. 20, various air conditioning products may be installed in the room. In addition, the installation positions of the air conditioning products may be different from each other.

The air conditioning product may include an air conditioner, an air purifier, a dehumidifier, a humidifier, a general fan, and a heating device For example, the ceiling fan 1 may be installed on a ceiling in a room. In addition, other air conditioning products may be installed at mutually different positions in the room. In detail, a wall-mounted air conditioner D1 may be installed on one wall surface, and an air purifier D2 or a humidifier may be installed on an opposite side in the room.

Meanwhile, as described above, the ceiling fan 1 may operate by interworking with the air conditioner D1 and the air purifier D2.

In this case, the ceiling fan 1, the air conditioner D1, and the air purifier D2 may share the indoor air environment set by the user. In other words, various air conditioning products installed in the interior space may interwork with each other and may operate with the same user set value.

That is, all the air conditioning products installed in the interior space may interwork with each other to uniformly and totally control indoor air-conditioning environments.

Accordingly, since air conditioning products operate on the ceiling, the wall surface, and the floor in the room, the indoor air circulation may be performed quickly and the cooling or heating effect can be improved.

In other words, according to the cooling mode or the heating mode, the indoor temperature may be rapidly reached to the set temperature, and the air purifying time is shortened. Accordingly, the user M may feel the sense of comfort for the interior air environment.

In addition, an amount of dust, the temperature, and the like are detected at the position where each air conditioning product is installed, and the air conditioning product operates to reach the user setting value, so the red zone may be resolved and the uniform interior air environment may be totally made.

The invention claimed is:

1. A ceiling fan comprising:
a shaft to couple to a ceiling or a wall surface;
a motor assembly provided to surround the shaft;
a bridge support coupled to a lower portion of the shaft;
an electronic unit supported by the bridge support and positioned under the bridge support;
a housing cover to receive the motor assembly and the electronic unit;
a main blade coupled to the housing cover to be rotatable; and
a sub-blade disposed at the main blade,
wherein the shaft is positioned on a central axis of the housing cover,
wherein the electronic unit includes:
a bridge case coupled to the bridge support;
a control assembly seated on the bridge case; and
a display cover coupled to a low portion of the bridge case.

2. The ceiling fan of claim 1, wherein the bridge case is coupled to the display cover to cover an internal space of the bridge case having a plurality of electronic components therein.

3. The ceiling fan of claim 1, wherein the display cover is positioned to be spaced apart from a lower end of the housing cover.

4. The ceiling fan of claim 1, wherein the control assembly includes:
a lower control case seated on a top surface of the bridge case; and
an upper control case to cover an upper portion of the lower control case.

5. The ceiling fan of claim 1, wherein the motor assembly includes:
a stator coupled to the shaft; and
a rotor spaced apart from an outer circumferential surface of the stator and rotatable,
wherein the housing cover is coupled to the rotor.

6. The ceiling fan of claim 1, wherein the bridge support includes:
a support plate coupled to the shaft; and
a plurality of bridges extending downward from the support plate.

7. The ceiling fan of claim 1, wherein the electronic unit includes:
a communication module to communicate with a cooling and heating appliance; and
a control unit configured to interwork with the cooling and heating appliance and to control the motor assembly.

8. The ceiling fan of claim 7, wherein the control unit is configured to perform a control operation to manage indoor air by combining sensing information obtained from a sensing module to detect an indoor temperature, indoor humidity, an indoor dust quantity with information received from the interworking cooling and heating appliance.

9. The ceiling fan of claim 7, wherein the control unit is configured to determine a red zone by comparing a user setting temperature with an indoor temperature with respect to a partitioned space of the interior space, and
the control unit is configured to perform a control operation to remove the red zone by changing a setting of an interworking cooling and heating appliance, which is closer to the red zone, than other interworking cooling and heating appliances.

10. A ceiling fan comprising:
a shaft to couple to a ceiling or a wall surface;
a motor assembly coupled to the shaft to provide a rotational power;
a bridge support coupled to the shaft, under the motor assembly, and including a bridge extending downward;
a bridge case coupled to a lower end of the bridge;
a control assembly positioned between the bridge case and the bridge support;

a display cover coupled to a lower portion of the bridge case; and
a display module provided at the display cover and including a light emitting device,
wherein the display cover includes a light guide extending upward from a base surface of the display cover and having a hole at the base surface, the light guide to guide light supplied from the light emitting device,
wherein the display module is seated on a top surface of the light guide, and
wherein the display cover further includes:
a display module guide protruding upward from a base surface of the display cover to fix the display module; and
a display module coupling device that elastically deforms to introduce the display module therein.

11. The ceiling fan of claim 10, wherein an escutcheon, which is a cover that transmits light, is provided on a bottom surface of the display cover, and the escutcheon has a pattern which is formed at a position corresponding to the light emitting device and the light guide and indicates a function of the ceiling fan.

12. The ceiling fan of claim 10, wherein the control assembly includes:
a lower control case seated on the bridge case;
an upper control case to cover the lower control case; and
a main printed circuit board (PCB) disposed in an internal space formed by the lower control case and the upper control case, and wherein the bridge case includes:
an inner bridge extending upward to pass through the lower control case, the main PCB, and the upper control case.

13. A ceiling fan comprising:
a shaft to couple to a ceiling or a wall surface;
a motor assembly coupled to the shaft to provide a rotational power;
a bridge support coupled to the shaft, under the motor assembly, and including a bridge extending downward;
a bridge case coupled to a lower end of the bridge;
a control assembly positioned between the bridge case and the bridge support;
a display cover coupled to a lower portion of the bridge case;
a display module provided at the display cover and including a light emitting device, and
an anti-bug module positioned in an internal space formed by the bridge case and the display cover to eliminate a pest,
wherein the anti-bug module includes:
an anti-bug printed circuit board (PCB) including an ultrasonic oscillation circuit; and
a speaker connected with the anti-bug PCB to output an ultrasound.

* * * * *